United States Patent
Kang et al.

(10) Patent No.: US 10,838,172 B2
(45) Date of Patent: Nov. 17, 2020

(54) OPTICAL LENS ASSEMBLY, DEVICE, AND IMAGE FORMING METHOD

(71) Applicant: Samsung Electronics Co., Ltd., Gyeonggi-do (KR)

(72) Inventors: Byung-kwon Kang, Gyeonggi-do (KR); Liefeng Zhao, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/770,998

(22) PCT Filed: Aug. 22, 2016

(86) PCT No.: PCT/KR2016/009217
§ 371 (c)(1),
(2) Date: Apr. 25, 2018

(87) PCT Pub. No.: WO2017/078255
PCT Pub. Date: May 11, 2017

(65) Prior Publication Data
US 2018/0307006 A1    Oct. 25, 2018

(30) Foreign Application Priority Data
Nov. 2, 2015 (KR) .......................... 10-2015-0153255

(51) Int. Cl.
*G02B 9/36*       (2006.01)
*G02B 13/00*      (2006.01)
(Continued)

(52) U.S. Cl.
CPC .............. *G02B 13/004* (2013.01); *G02B 9/36* (2013.01); *G02B 13/0045* (2013.01);
(Continued)

(58) Field of Classification Search
CPC .............. G02B 13/004; G02B 13/0045; G02B 27/0037; G02B 9/36; G02B 9/64
See application file for complete search history.

(56) References Cited

U.S. PATENT DOCUMENTS 7,079,330 B2   7/2006  Lee et al.
7,184,222 B2   2/2007  Nishina
(Continued)

FOREIGN PATENT DOCUMENTS

CN    103941376 A    7/2014
JP    2005134486 A   5/2005
(Continued)

OTHER PUBLICATIONS

European Search Report dated Oct. 4, 2018.
International Search Report, dated Nov. 22, 2016.
Chinese Search Report dated Apr. 29, 2020.

*Primary Examiner* — Joseph P Martinez
(74) *Attorney, Agent, or Firm* — Cha & Reiter, LLC.

(57) ABSTRACT

Provided are an optical lens assembly and an electronic device including the optical lens assembly.

The optical lens assembly includes a front group closest to an object side and including a first lens having a positive refractive power and an image side surface that is concave, and a second lens having a negative refractive power, a third lens having a negative refractive power, and a fourth lens having a positive refractive power. Other embodiments may be provided.

15 Claims, 27 Drawing Sheets

(51) Int. Cl.
*G02B 27/00* (2006.01)
*H04N 5/225* (2006.01)
*G02B 9/64* (2006.01)

(52) U.S. Cl.
CPC ....... *G02B 27/0037* (2013.01); *H04N 5/2253* (2013.01); *H04N 5/2254* (2013.01); *G02B 9/64* (2013.01)

(56) References Cited

U.S. PATENT DOCUMENTS

| | | |
|---|---|---|
| 8,314,999 B1 | 11/2012 | Tsai |
| 8,385,011 B2 | 2/2013 | Sato et al. |
| 8,508,860 B2 | 8/2013 | Tang et al. |
| 8,976,455 B2 | 3/2015 | Nagahara et al. |
| 9,323,027 B2 | 4/2016 | Ahn et al. |
| 9,405,099 B2 | 8/2016 | Jo et al. |
| 10,473,895 B2 | 11/2019 | Jo et al. |
| 2005/0141103 A1 | 6/2005 | Nishina |
| 2012/0206641 A1 | 8/2012 | Baba |
| 2014/0204480 A1 | 7/2014 | Jo et al. |
| 2015/0029601 A1 | 1/2015 | Dror et al. |
| 2015/0138652 A1 | 5/2015 | Lee |
| 2015/0241669 A1 | 8/2015 | Amano et al. |
| 2017/0269333 A1* | 9/2017 | Jhang .................. G02B 13/004 |

FOREIGN PATENT DOCUMENTS

| | | |
|---|---|---|
| JP | 2013-142782 A | 7/2013 |
| KR | 10-2010-0087623 A | 8/2010 |
| KR | 10-2012-0090992 A | 8/2012 |
| KR | 10-2014-0052579 A | 5/2014 |
| KR | 10-2014-0094334 A | 7/2014 |
| KR | 10-2015-0080327 A | 7/2015 |
| WO | 2013-001804 A1 | 1/2013 |
| WO | 2014/076924 A1 | 5/2014 |

* cited by examiner

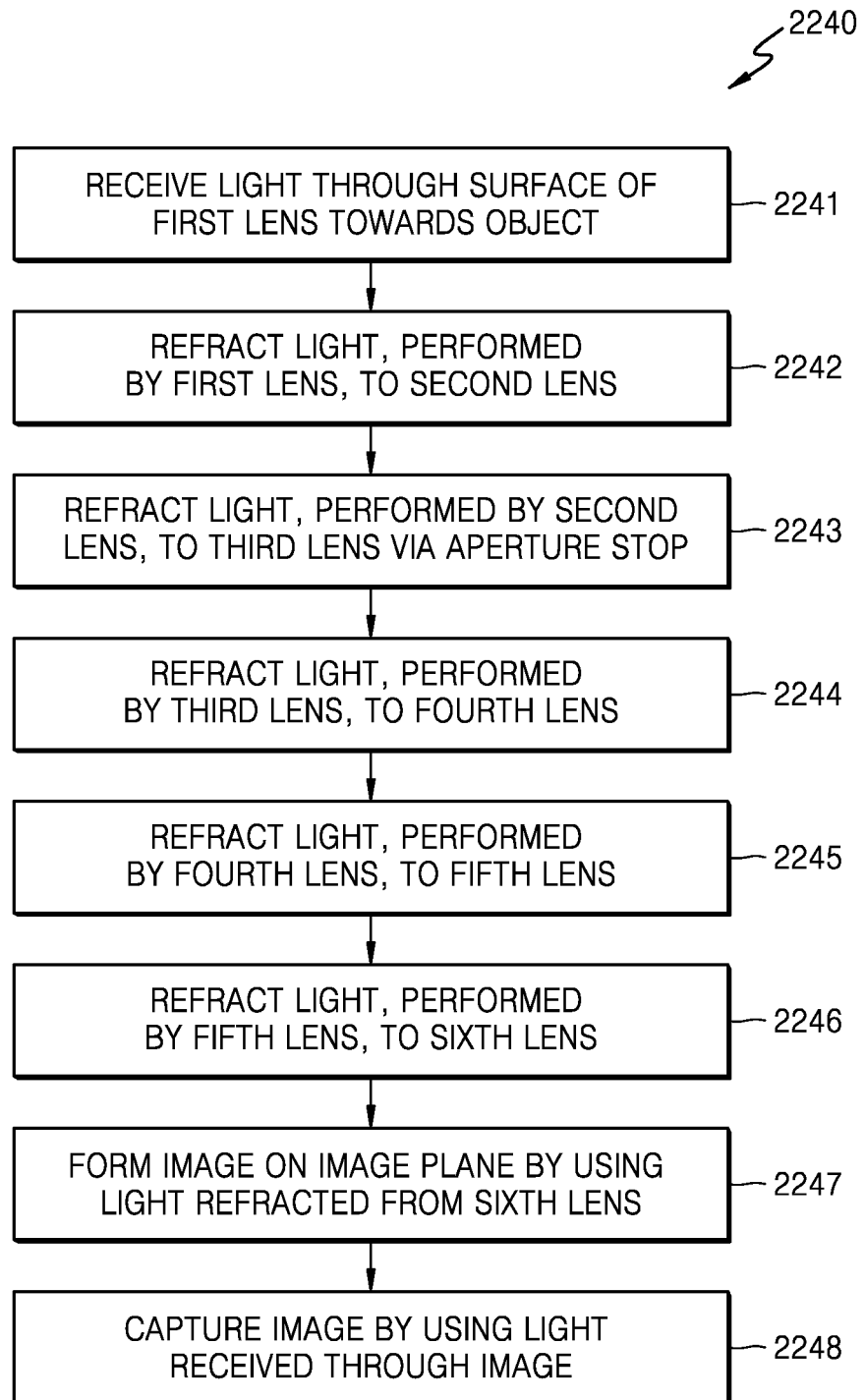

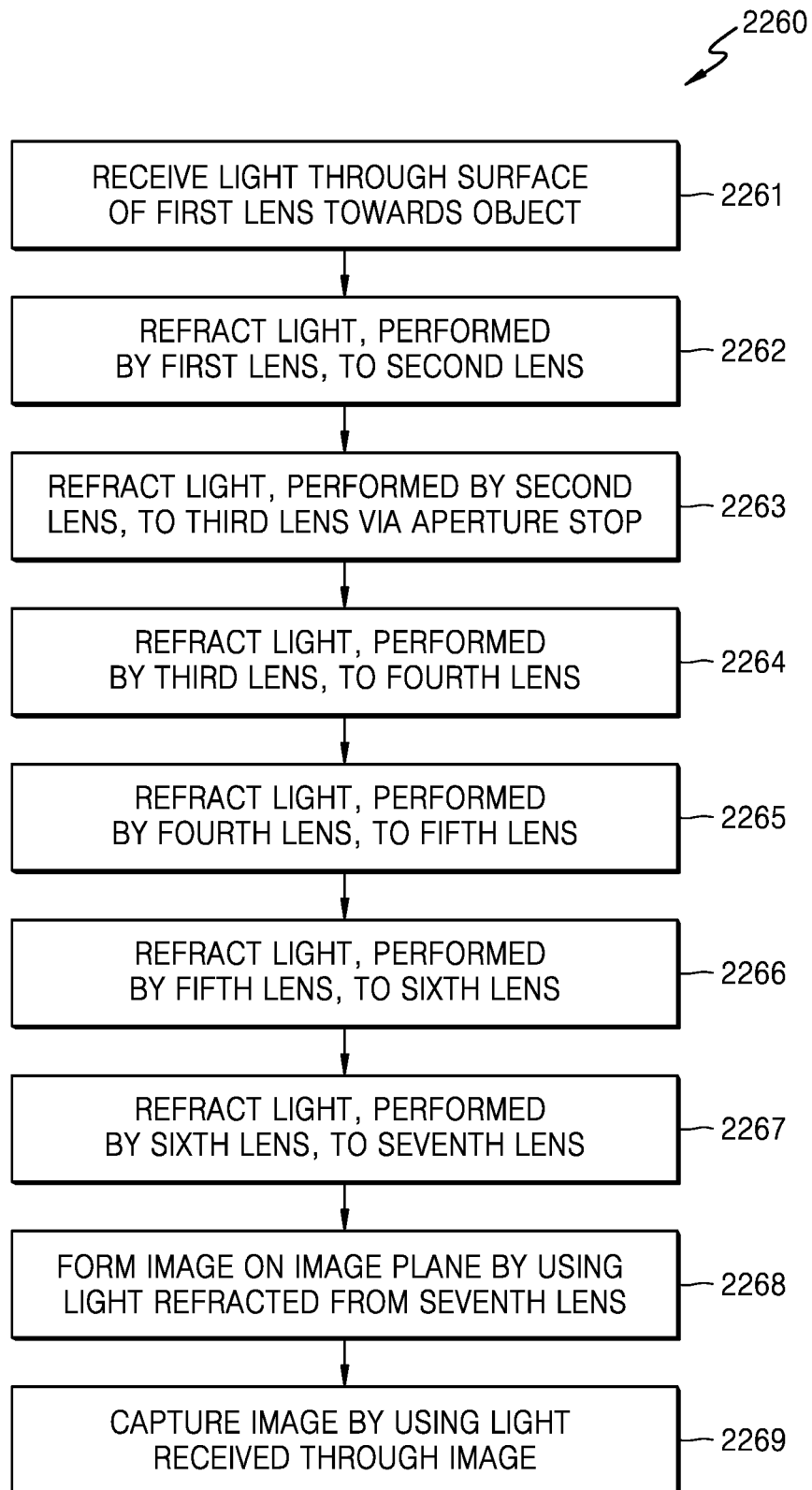

OPTICAL LENS ASSEMBLY, DEVICE, AND IMAGE FORMING METHOD

CLAIM OF PRIORITY

This application is a National Phase Entry of PCT International Application No. PCT/KR2016/009217, which was filed on Aug. 22, 2016, and claims a priority to Korean Patent Application No. 10-2015-0153255, which was filed on Nov. 2, 2015, the contents of which are incorporated herein by reference.

MODE OF DISCLOSURE

Technical Field

The present disclosure relates to an optical lens assembly, a device, and an image forming method, for example, an optical lens assembly, a device, and an image forming method provided in an electronic device.

BACKGROUND ART

Various services and additional functions provided by electronic devices are gradually expanding. An electronic device, e.g., a mobile device or a user device, may provide various services via various sensor modules. An electronic device may provide a multimedia service, for example, a picture service or video service. As electronic devices have become more widely used, utilization of a camera functionally connected to an electronic device has gradually increased. According to user demand, camera performance and/or resolution in an electronic device is gradually improving. Various kinds of scenes, people, or selfies may be captured by a camera of an electronic device. In addition, such multimedia, for example, pictures or videos, may be shared on a social network site or other media.

As semiconductor and display techniques have developed, optical lens assemblies for a camera in a mobile device, e.g., from a low resolution to a high resolution, from a small-sized sensor format to a large-sized sensor format, for example, from a ⅛" sensor to a ½" sensor, and from a lens assembly with a smaller number of lenses to a lens assembly with a greater number of lenses, are being developed.

DESCRIPTION OF EMBODIMENTS

Technical Problem

When an optical lens assembly for a camera is mounted in an electronic device, multimedia, e.g., photos or videos may be generated, and the multimedia may be provided to a user. In the market of mobile devices, there have been trends to reduce a thickness of an electronic device by mounting an optical lens assembly in the electronic device. For example, a thickness of an electronic device may be reduced to about 10 mm to 6 mm. Such trends may be incompatible with the increase in the number of lenses and the increase in sensor size. For example, it may be difficult to implement high-specification performance required by a user by using a smaller number of lenses. Also, it may be difficult to mount an optical lens assembly that satisfies optical characteristics and/or aberration characteristics while trying to make an electronic device thinner.

One or more embodiments of the present disclosure provide a small-sized telephoto optical lens assembly in, for example, an electronic device (e.g., a portable terminal).

Also, one or more embodiments provide a photographing apparatus including, for example, a small-sized telephoto optical lens assembly.

Solution to Problem

According to one or more embodiments, provided is an optical lens assembly including, sequentially from an object side to an image side: a first lens having a positive refractive power and including a surface concave towards the image side; a second lens having a negative refractive power; a third lens having a negative refractive power; and a fourth lens having a positive refractive power and adjacent to the image side, wherein the optical lens assembly satisfies the following condition:

$0 \leq YL/YM < 0.4$ $28 < FOV < 60$ (Degrees),   <Condition> where YL denotes a distance from an optical axis to a maximum sag in an image side surface of the fourth lens, YM denotes ½ of an effective diameter of the image side surface of the fourth lens, and FOV denotes a viewing angle.

According to one or more embodiments, provided is an optical lens assembly including, sequentially from an object side to an image side: a first lens having a positive refractive power and including a surface concave towards the image side; a second lens having a negative refractive power; a third lens having a negative refractive power; and a fourth lens having a positive refractive power and adjacent to the image side, wherein the optical lens assembly has a viewing angle that is greater than 35° and less than 49°.

According to one or more embodiments, provided is an optical lens assembly including, sequentially from an object side to an image side: a first lens having a positive refractive power and including a surface concave towards the image side; a second lens having a negative refractive power; a third lens having a negative refractive power; and a fourth lens having a positive refractive power, having a surface convex towards the object, and adjacent to the image side, wherein the optical lens assembly satisfies the following condition:

$0 \leq YL/YM < 0.4$ $28 < FOV < 60$ (Degrees),   <Condition> where YL denotes a distance from an optical axis to a maximum sag in an image side surface of the fourth lens, YM denotes ½ of an effective diameter of the image side surface of the fourth lens, and FOV denotes a viewing angle.

According to one or more embodiments, provided is an optical lens assembly including, sequentially from an object side to an image side: a first lens having a positive refractive power and including a surface concave towards the image side; a second lens having a negative refractive power; a third lens having a negative refractive power; and a fourth lens having a positive refractive power, having a surface convex towards the object, and adjacent to the image side, wherein the optical lens assembly has a viewing angle that is less than 49°.

According to one or more embodiments, there is provided an electronic device including: an optical lens assembly; and an image sensor configured to receive light focused by the optical lens assembly, wherein the optical lens assembly includes, sequentially from an object side to an image side: a first lens having a positive refractive power and including a surface concave towards the image side; a second lens having a negative refractive power; a third lens having a negative refractive power; and a fourth lens having a positive refractive power and adjacent to the image side, wherein the optical lens assembly satisfies the following condition:

$$0 \le YL/YM < 0.4$$

$$28 < FOV < 60 \text{ (Degrees)}, \qquad \text{<Condition>}$$

where YL denotes a distance from an optical axis to a maximum sag in an image side surface of the fourth lens, YM denotes ½ of an effective diameter of the image side surface of the fourth lens, and FOV denotes a viewing angle.

According to one or more embodiments, there is provided an image forming method includes, for example, an operation in which light having a viewing angle within a range of 28° to 60° is incident to a first lens having a positive refractive power and a surface concave towards an image side; an operation in which the light is refracted by the first lens and incident to a second lens having a negative refractive power; an operation in which the light is refracted by the second lens and incident to a third lens having a negative refractive power; an operation in which the light is refracted by the third lens and incident to a fourth lens having a positive refractive power and adjacent to the image side; and an operation in which an image sensor receives the light passed through the fourth lens to form an image, wherein the fourth lens satisfies a condition 0≤YL/YM<0.4 where YL denotes a distance from an optical axis to a maximum sag in an image side surface of the fourth lens, and YM denotes ½ of an effective diameter of the image side surface of the fourth lens.

Advantageous Effects of Disclosure

An optical lens assembly according to various embodiments may be, for example, small-sized and may have high performance. Also, a photographing apparatus including an optical lens assembly according to an embodiment may capture multi-media (e.g., photos, videos, etc.) with a telephoto lens.

BRIEF DESCRIPTION OF DRAWINGS

FIGS. 22A to 22D are higher-level flowcharts illustrating methods of performing image capturing by using an optical lens assembly in an electronic device according to various embodiments.

MODE OF DISCLOSURE

Figure 1:
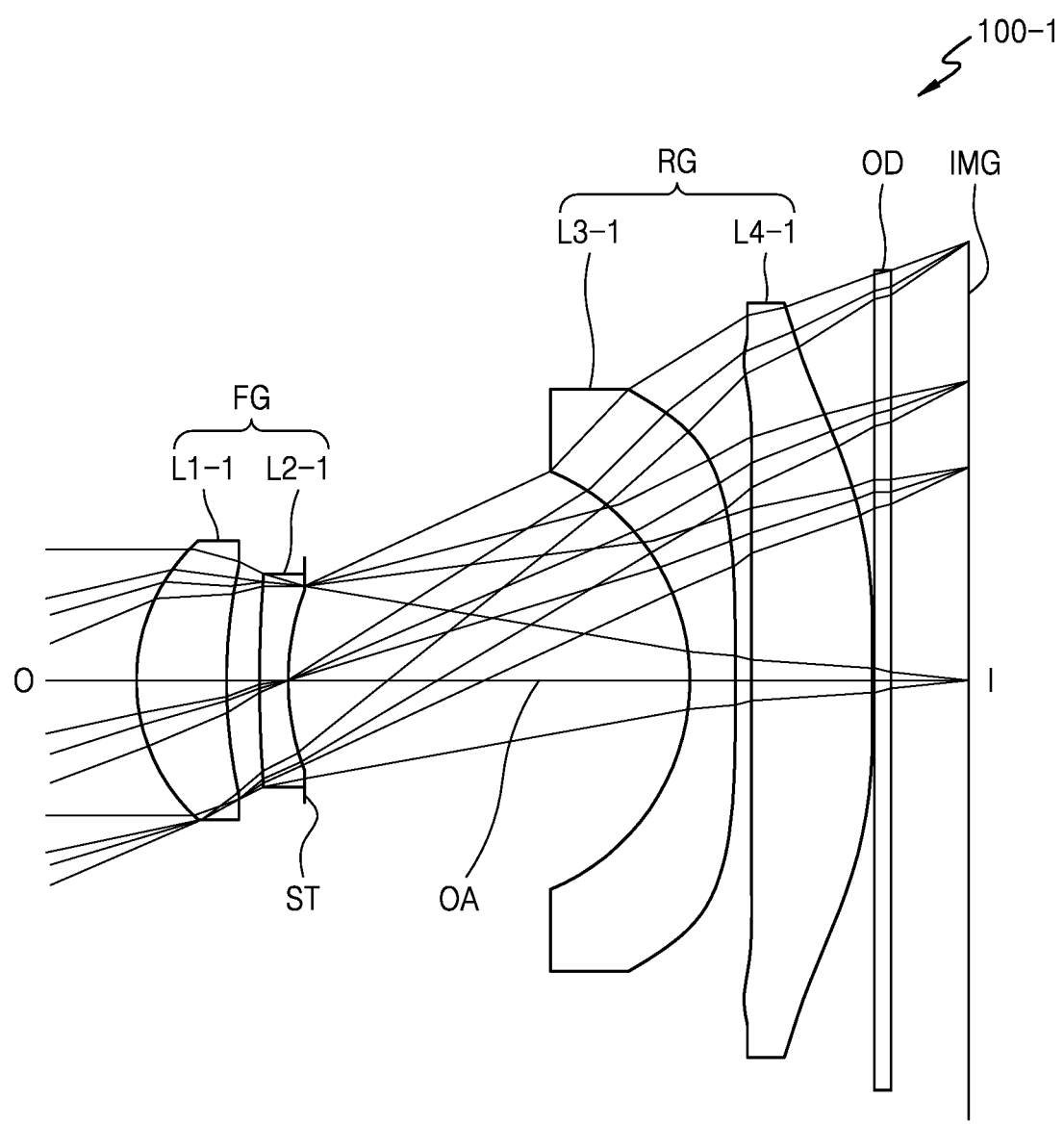
FIG. 1 is a diagram of an optical lens assembly of a first numerical example, according to various embodiments.

Hereinafter, one or more embodiments of the present disclosure will be described below with reference to accompanying drawings. However, the techniques disclosed in the present disclosure are not limited to a certain embodiment, but should be appreciated to include various modifications, equivalents, and/or alternatives of the embodiments. Regarding the description of the drawings, like reference numerals may be used for like components.

It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

As used herein, the term "A or B", "at least one of A and/or B", or "one or more of A and/or B" includes any and all combinations of one or more of the associated listed items. For examples, "A or B", "at least one of A and B", "at least one of A or B" each may include (1) at least one A, or include (2) at least one B, or include (3) both at least one A and at least one B.

Ordinal numbers as herein used, such as "first", "second", etc., may modify various components of various embodiments, but do not limit those components. For example, these terms do not limit the order and/or importance of the components. These terms are only used to distinguish one component from another. For example, a first user device and a second user device are different user devices from each other, regardless of an order or significance. For example, according to various embodiments of the present disclosure, a first component may be denoted a second component, and vice versa without departing from the scope of the present disclosure.

When a component (e.g., a first component) is "(operatively or communicatively) connected to or coupled to" another component (a second component), the component may be directly connected or coupled to the other component, or other component(s) (e.g., a third component) may intervene therebetween. In contrast, when a component (e.g., a first component) is directly "connected to" or "directly coupled to" another component (e.g., a second component), no other intervening components (e.g., a third component) may intervene therebetween.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms as used in various embodiments of the present disclosure are merely for the purpose of describing particular embodiments and are not intended to limit the present disclosure to the various embodiments. As used herein, the singular forms are intended to include the plural forms as well, unless the context clearly indicates otherwise. Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in the present disclosure. In some cases, even the term defined in the disclosure should not be interpreted to exclude embodiments of the disclosure.

An electronic device according to various example embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various example embodiments, the wearable device may include, for example, at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like.

According to some example embodiments, the electronic device may, for example, be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another example embodiment, the electronic device may include, for example, at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some example embodiments, the electronic device may include, for example, at least one of a part of furniture or a building/structure, an electronic board, an electronic signature receiving device, a projector, and various kinds of measuring instruments (e.g., a water meter, an electric meter, a gas meter, and a radio wave meter). The electronic device according to various example embodiments of the disclosure may, for example, be a combination of one or more of the aforementioned various devices. The electronic device according to some example embodiments of the disclosure may be a flexible device, or the like. Further, the electronic device according to an example embodiment of the disclosure is not limited to the aforementioned devices, and may include a new electronic device according to the development of technology.

An electronic device according to various example embodiments will be described with reference to the accompanying drawings. As used herein, the term "user" may indicate a person who uses an electronic device or a device (e.g., an artificial intelligence electronic device) that uses an electronic device.

Hereinafter, an optical lens assembly, a device including the optical lens assembly, and an image forming method according to various embodiments will be described with reference to accompanying drawings.

FIG. 1 is a diagram of an optical lens assembly 100-1 of a first example, according to various embodiments.

According to various embodiments, the optical lens assembly 100-1 may include, sequentially from an object side O to an image side I, a first lens L1-1 having a positive refractive power, a second lens L2-1 having a negative refractive power, a third lens L3-1 having a negative refractive power, and a fourth lens L4-1 having a positive refractive power. According to various embodiments, the optical lens assembly 100-1 may include a front group FG arranged at the object side O and a rear group RG arranged at the image side I. The front group FG may be expressed as, for example, a first lens group, and the rear group RG may be expressed as a second lens group. Also, the object side may represent a direction in which a subject is positioned.

Hereinafter, when components of each lens are described, the image side I may denote a direction indicating an image plane IMG in which an image is focused and the object side O may denote a direction indicating an object. In addition, an "object side surface" of a lens denotes a lens surface at a side where an object exists based on an optical axis OA, that is, a left surface on the drawings, and an "image side surface" of the lens denotes a lens surface towards the image plane IMG based on the optical axis OA, that is, a right surface on the drawings. The image plane IMG may be, for example, an imaging device surface or an image sensor surface. An image sensor may include, for example, a sensor such as a complementary metal oxide semiconductor (CMOS) image sensor or a charge coupled device (CCD). The image sensor IS is not limited thereto, for example, may be a device converting light, for example, an image of an object into an electric image signal.

According to various embodiments, the front group FG may include, for example, a first lens L1 having a positive refractive power, and a second lens L2 having a negative refractive power. The first lens L1-1 may have, for example, a concave image side surface. The first lens L1-1 may be, for example, a meniscus lens that is concave toward the image side. The second lens L2-1 may include, for example, a concave image side surface. The second lens L2-1 may be a bi-concave lens or a meniscus lens.

According to various embodiments, the rear group RG may include, for example, the third lens L3-1 having the negative refractive power, and the fourth lens L4-1 having the positive refractive power. At least one of the third lens L3-1 and the fourth lens L4-1 may be, for example, an aspherical surface. For example, each of the third lens L3-1 and the fourth lens L4-1 may be an aspherical surface. Also, a lens having a positive refractive power may be expressed as, for example, a positive lens, and a lens having a negative refractive power may be expressed, for example, a negative lens. Hereinafter, the front group FG may be classified as a lens group including at least a positive lens and a negative lens closest to the object side, and the rear group RG may be classified as a lens group including at least a negative lens and a positive lens closest to the image side. However, the present disclosure is not limited thereto, for example, based on an aperture stop ST, a lens group arranged at an object side of the aperture stop may be classified as a front group and a lens group arranged at an image side of the aperture stop may be classified as a rear group. Also, the optical lens assembly 100-1 may further include, for example, an intermediate group between the front group and the rear group. The intermediate group may be expressed as, for example, a third lens group. FIG. 1 shows an example, in which the lens groups are classified as front group FG and the rear group RG.

According to various embodiments, at least one of the third lens L3-1 and the fourth lens L4-1 may have a surface having at least one inflection point. The inflection point, for example, may refer to a point at which the sign of a radius of curvature of a lens surface changes from positive (+) to negative (−), or from negative (−) to positive (+). Otherwise, the inflection point, for example, may refer to a point at which a shape of a lens changes from a convex shape to a concave shape or from a concave shape to a convex shape. The radius of curvature may denote a value representing a degree of curvature at each point in a curved surface or a curved line.

According to various embodiments, the third lens L3-1 may include, for example, a concave object side surface. For example, the image side surface of the third lens L3-1 may have at least one inflection point. The third lens L3-1 may have, for example, a concave shape towards the image side I at a region of an image side surface around an optical axis (within a predetermined radius from the optical axis). The object side surface of the third lens L3-1, for example, may have a concave shape around the optical axis and have a convex shape away from the optical axis.

According to various embodiments, the fourth lens L4-1 may include a convex object side surface. Alternately, the fourth lens L4-1 may include a concave object side surface. The fourth lens L4-1, for example, may have at least one inflection point in an image side surface. The image side surface of the fourth lens L4-1 may be, for example, concave around the optical axis and convex away from the optical axis.

According to various embodiments, an aperture stop ST may be further provided between the object side O and the rear group RG. For example, the aperture stop ST may be arranged between the front group FG and the rear group RG. For example, the aperture stop ST may be arranged on an image side O of the second lens L2-1.

According to various embodiments, at least one optical device OD may be provided between the fourth lens L4-1 and the image plane IMG. The optical device OD may include at least one of, for example, a low pass filter, an infrared (IR)-cut filter, and a cover glass. For example, when the IR cut-off filter is provided as the optical device, the visible ray is transmitted and IR ray may be discharged to outside so that the IR ray may not be transferred to the image plane IMG. However, the optical lens assembly may be configured without including the optical device.

According to various embodiments, the optical lens assembly 100-1 may have a viewing angle smaller than 60°. For example, the optical lens assembly 100-1 may have a viewing angle that is less than 49. For example, the optical lens assembly 100-1 may have a viewing angle that is greater than 28° and less than 60°. For example, the optical lens assembly 100-1 may have a viewing angle that is greater than 28° and less than 49°.

Figure 3:
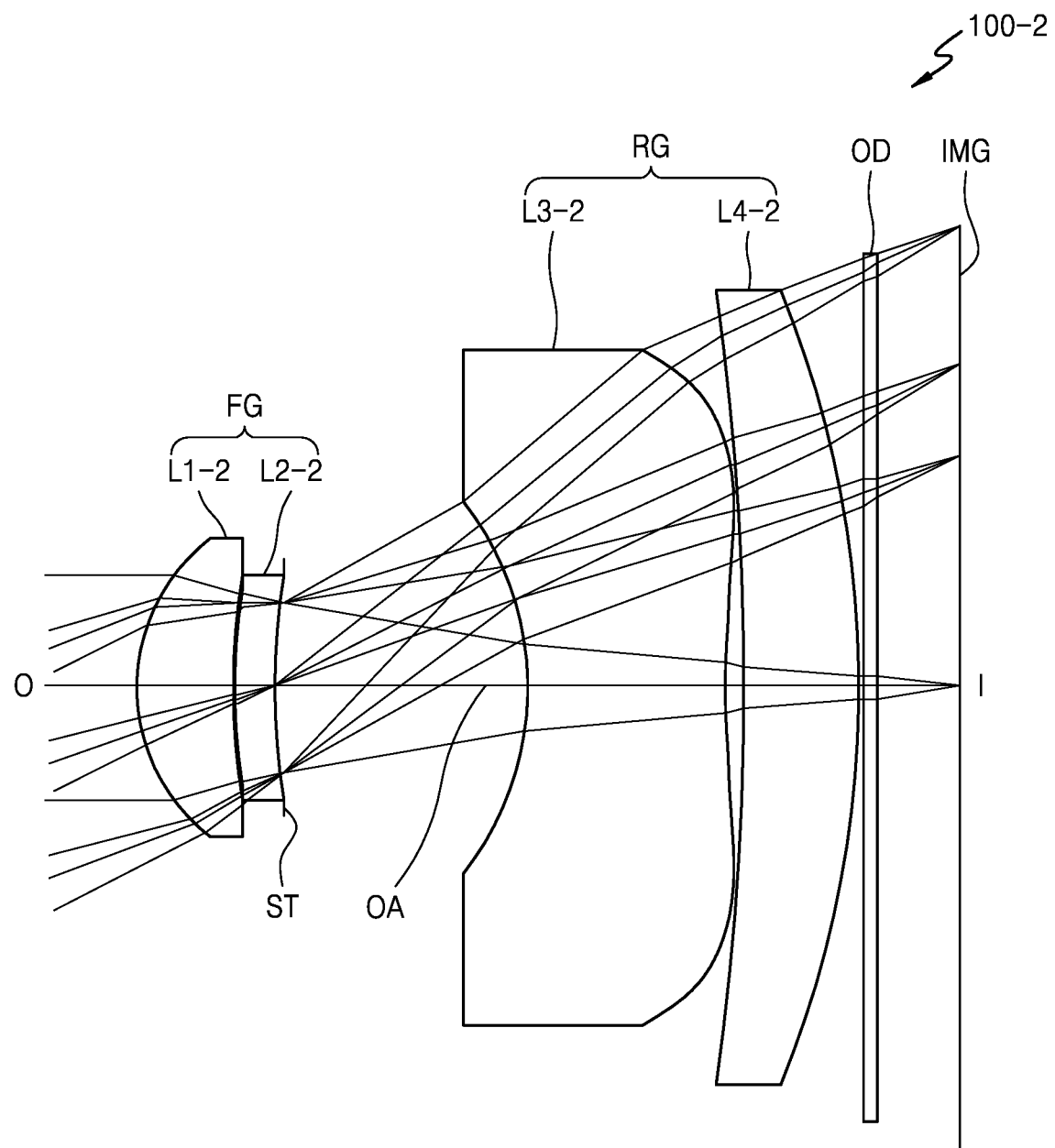
FIG. 3 is a diagram of an optical lens assembly of a second numerical example, according to various embodiments.

FIG. 3 is a diagram of an optical lens assembly 100-2 of a second numerical example, according to various embodiments.

According to various embodiments, the optical lens assembly 100-2 may include, sequentially from an object side O to an image side I, a first lens L1-2 having a positive refractive power, a second lens L2-2 having a negative refractive power, a third lens L3-2 having a negative refractive power, and a fourth lens L4-2 having a positive refractive power. In the present embodiment, descriptions about elements that are similar to those of the above-described embodiment are omitted, and each of the lenses (e.g., the first lens L1-2, the second lens L2-2, the third lens L3-2, and the fourth lens L4-2) will be described.

According to various embodiments, a front group FG of the optical lens assembly 100-2 may include, for example, the first lens L1-2 having the positive refractive power, and the second lens L2-2 having the negative refractive power. The first lens L1-2 may have a concave image side surface. The first lens L1-2 may be a meniscus lens that is concave towards the image side. The second lens L2-2 may include a concave image side surface. The second lens L2-2 may be a meniscus lens that is concave towards the image side.

The rear group RG may include, for example, the third lens L3-2 having a negative refractive power, and the fourth lens L4-2 having a positive refractive power. For example, each of the third lens L3-2 and the fourth lens L4-2 may be an aspherical surface. An image side surface of the fourth lens L4-2 may have at least one inflection point. An object side surface of the fourth lens L4-2 may be convex around the optical axis and may be concave away from the optical axis.

According to various embodiments, each of the first lens L1-2, the second lens L2-2, the third lens L3-2, and the fourth lens L4-2 may have at least one aspherical surface. For example, the first lens, the second lens, the third lens, and the fourth lens may each be a double-aspherical lens. As such, the optical lens assembly that is compact and has a high resolution may be implemented. Also, at least one of the first lens, the second lens, the third lens, and the fourth lens includes a plastic material to reduce manufacturing costs, and to make manufacturing of the aspherical surface easy. For example, each of the first lens, the second lens, the third lens, and the fourth lens may be a plastic lens.

According to various embodiments, the optical lens assembly 100-2 may have a viewing angle smaller than 60°. For example, the optical lens assembly 100-2 may have a viewing angle that is greater than 28° and less than 60°.

Figure 5:
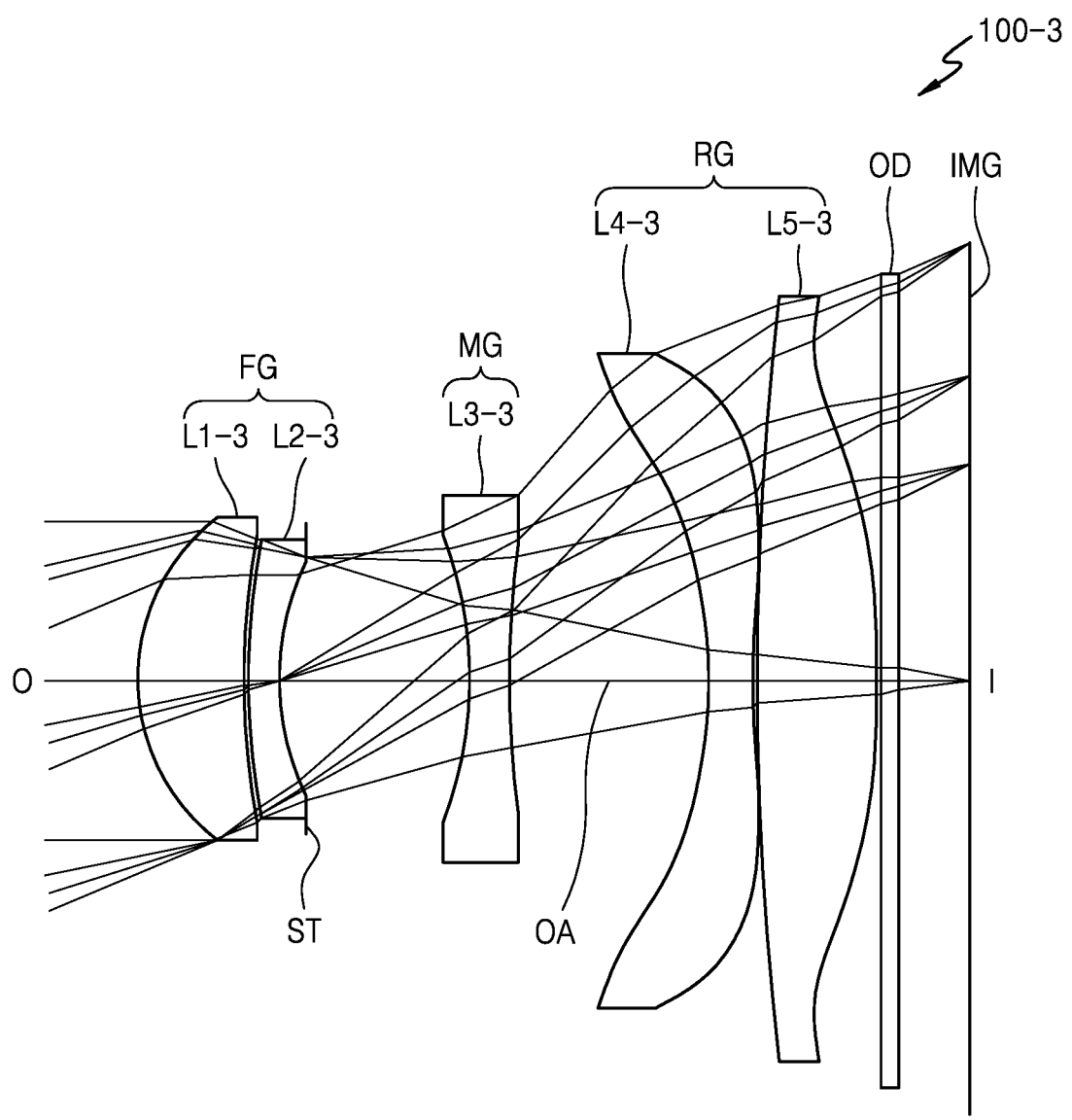
FIG. 5 is a diagram of an optical lens assembly of a third numerical example, according to various embodiments.

FIG. 5 shows an optical lens assembly 100-3 according to a third numerical example. According to various embodiments, the optical lens assembly 100-3 may include, sequentially from an object side O to an image side I, a first lens L1-3 having a positive refractive power, a second lens L2-3 having a negative refractive power, a third lens L3-3 having a negative refractive power, a fourth lens L4-3 having a negative refractive power, and a fifth lens L5-3 having a positive refractive power.

According to various embodiments, the optical lens assembly 100-3 may include a front group FG, an intermediate group MG, and a rear group RG. The front group FG of the optical lens assembly 100-3 may include, for example, the first lens L1-3 having the positive refractive power, and the second lens L2-3 having the negative refractive power. The first lens L1-3 may have a concave image side surface. The first lens L1-3 may be a meniscus lens that is concave towards the image side. The second lens L2-3 may include a concave image side surface. The second lens L2-3 may be a meniscus lens that is concave towards the image side. An aperture stop ST may be arranged at an image side surface of the second lens L2-3.

The intermediate group MG may include, for example, one lens. The intermediate group MG may include, for example, the third lens L3-3 having the negative refractive power. The third lens L3-3 may be, for example, a bi-concave lens. However, the third lens L3-3 may have a positive refractive power.

The rear group RG may include, for example, the fourth lens L4-3 having a negative refractive power, and the fifth lens L5-3 having a positive refractive power. For example, each of the fourth lens L4-3 and the fifth lens L5-3 may be an aspherical surface. An image side surface of the fifth lens L5-3 may have at least one inflection point. An object side surface of the fifth lens L5-3 may be convex around the optical axis and may be concave away from the optical axis.

According to various embodiments, the optical lens assembly 100-3 may have a viewing angle smaller than 60°. For example, the optical lens assembly 100-3 may have a viewing angle that is less than 49°. For example, the optical lens assembly 100-3 may have a viewing angle that is greater than 28° and less than 60°. For example, the optical lens assembly 100-3 may have a viewing angle that is greater than 28° and less than 49°.

Figure 7:
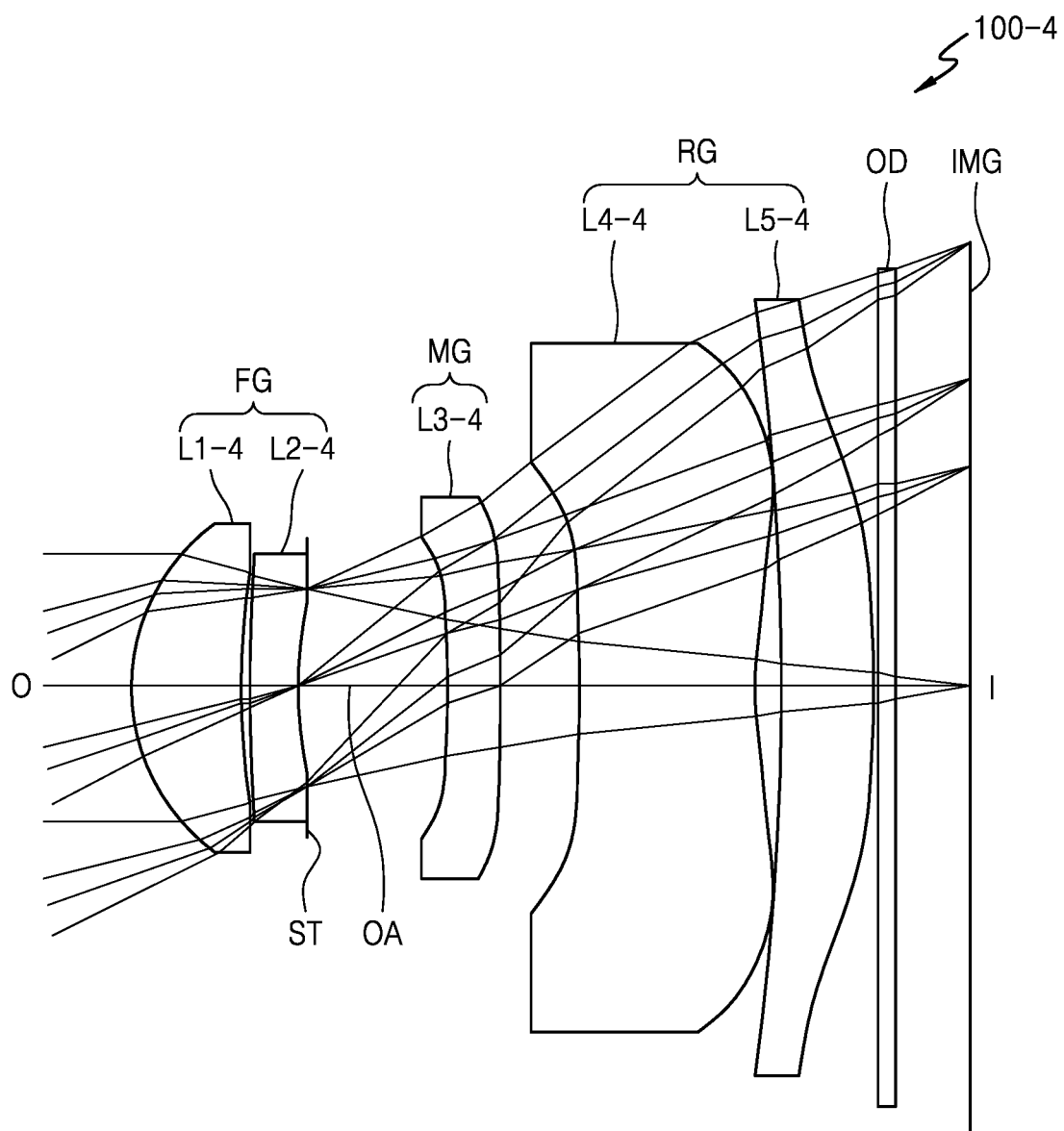
FIG. 7 is a diagram of an optical lens assembly of a fourth numerical example, according to one or more embodiments.

FIG. 7 shows an optical lens assembly 100-4 according to a fourth numerical example. According to various embodiments, the optical lens assembly 100-4 may include, sequentially from an object side O to an image side I, a first lens L1-4, a second lens L2-4, a third lens L3-4, a fourth lens L4-4, and a fifth lens L5-4. In the present embodiment, descriptions about elements similar to those of the above-described embodiment are omitted, and each of the lenses (e.g., the first lens L1-4, the second lens L2-4, the third lens L3-4, the fourth lens L4-4, and the fifth lens L5-4 will be described below.

The optical lens assembly 100-4 may include a front group FG, an intermediate group MG, and a rear group RG. The front group FG of the optical lens assembly 100-4 may include, for example, the first lens L1-4 and the second lens L2-4, the intermediate group MG may include the third lens L3-4, and the rear group RG may include the fourth lens L4-4 and the fifth lens L5-4.

According to various embodiments, the optical lens assembly 100-4 may have a viewing angle smaller than 60°. For example, the optical lens assembly 100-4 may have a viewing angle that is greater than 28° and less than 60°.

Figure 9:
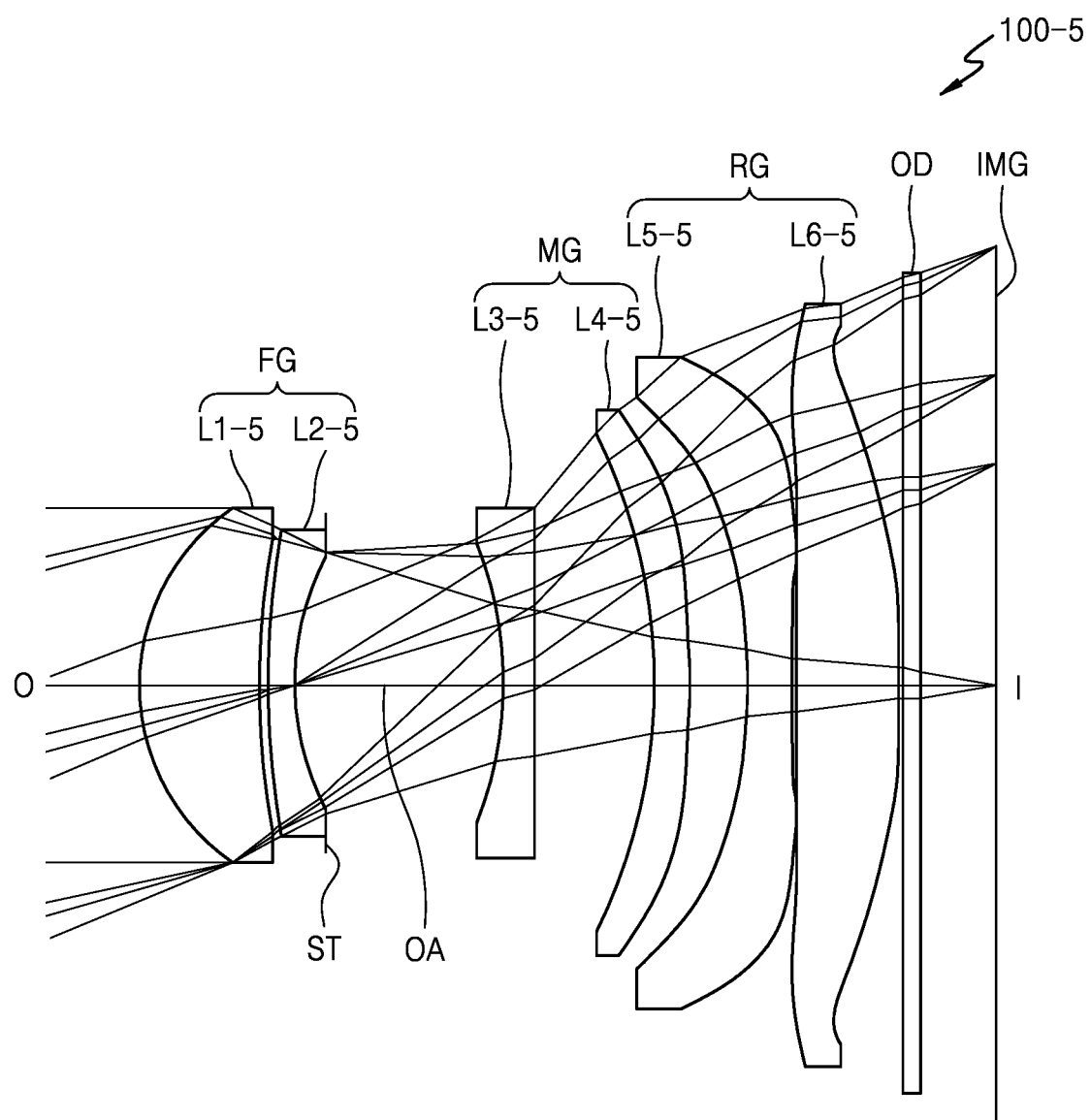
FIG. 9 is a diagram of an optical lens assembly of a fifth numerical example, according to one or more embodiments.

FIG. 9 shows an optical lens assembly 100-5 according to a fifth numerical example. According to various embodiments, the optical lens assembly 100-5 may include, sequentially from an object side O to an image side I, a first lens L1-5 having a positive refractive power, a second lens L2-5 having a negative refractive power, a third lens L3-5, a fourth lens L4-5, a fifth lens L5-5 having a negative refractive power, and a sixth lens L6-5 having a positive refractive power.

According to various embodiments, the optical lens assembly 100-5 may include a front group FG, an intermediate group MG, and a rear group RG. The front group FG of the optical lens assembly 100-5 may include the first lens L1-5 having the positive refractive power, and the second lens L2-5 having the negative refractive power. The first lens L1-2 may have a concave image side surface. The first lens L1-5 may be a meniscus lens that is concave towards the image side. The second lens L2-5 may include a concave image side surface. The second lens L2-5 may be a meniscus lens that is concave towards the image side.

The intermediate group MG may include, for example, two lenses. The intermediate group MG may include the third lens L3-5 and the fourth lens L4-5. The third lens L3-5 may be, for example, a bi-concave lens. The third lens L3-5 may have a negative or positive refractive power. The fourth lens L4-5 may have a negative or positive refractive power.

The rear group RG may include, for example, the fifth lens L5-5 having a negative refractive power, and the sixth lens L6-5 having a positive refractive power. For example, each of the fifth lens L5-5 and the sixth lens L6-5 may be an aspherical surface. The fifth lens L5-5 may have at least one inflection point in an image side surface. The image side surface of the fifth lens L5-5 may be concave around the optical axis and may be convex away from the optical axis. The sixth lens L6-5 may have at least one inflection point in an image side surface. For example, an object side surface of the sixth lens L6-5 may be convex.

According to various embodiments, the optical lens assembly 100-5 may have a viewing angle smaller than 60°. For example, the optical lens assembly 100-5 may have a viewing angle that is less than 49°. For example, the optical lens assembly 100-5 may have a viewing angle that is greater than 28° and less than 60°. For example, the optical lens assembly 100-5 may have a viewing angle that is greater than 35° and less than 49°.

Figure 11:
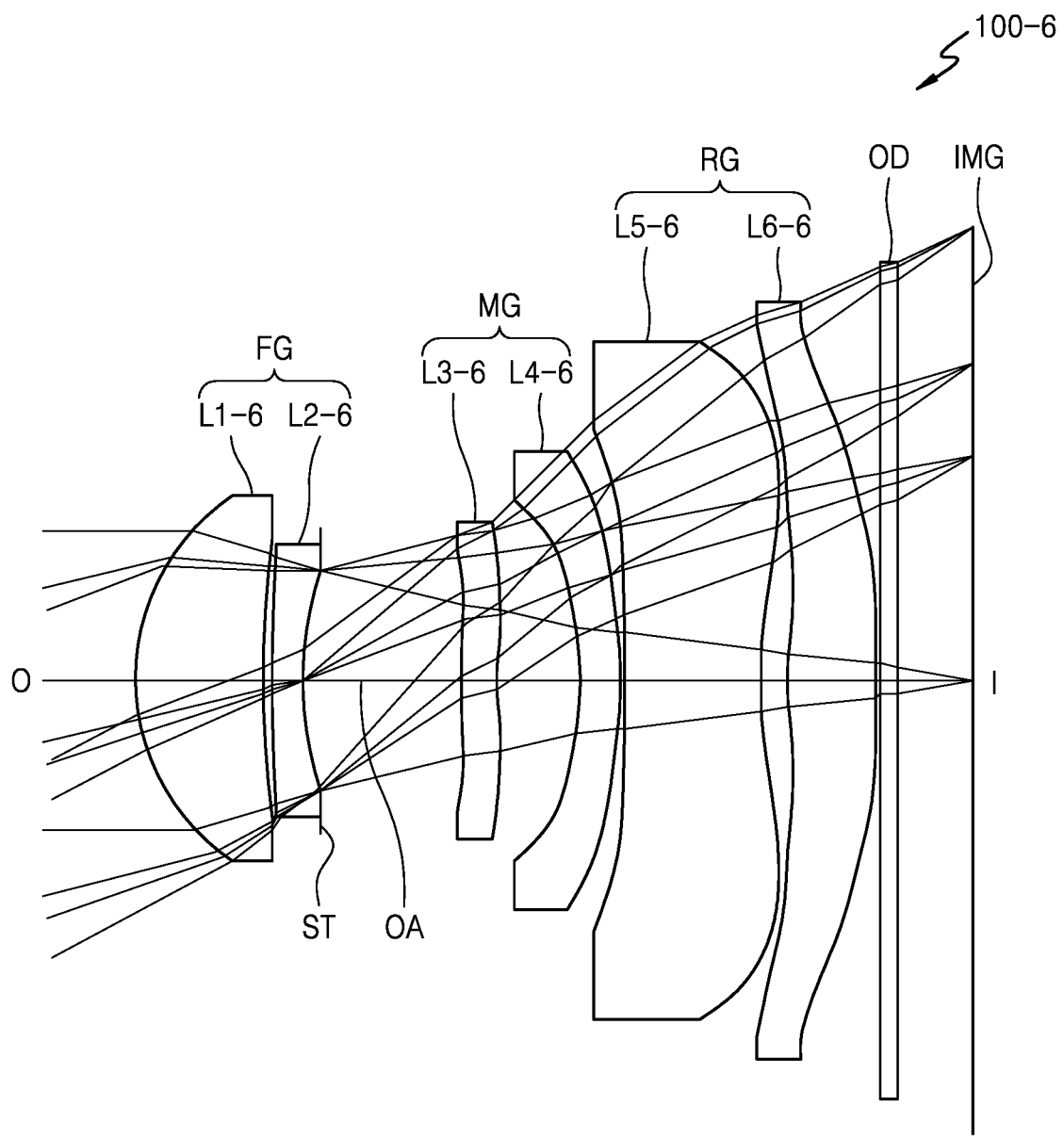
FIG. 11 is a diagram of an optical lens assembly of a sixth numerical example, according to one or more embodiments.

FIG. 11 is a diagram of an optical lens assembly 100-6 of a sixth numerical example, according to various embodiments.

According to various embodiments, the optical lens assembly 100-6 may include, sequentially from an object side O to an image side I, a first lens L1-6 having a positive refractive power, a second lens L2-6 having a negative refractive power, a third lens L3-6, a fourth lens L4-6, a fifth lens L5-6 having a negative refractive power, and a sixth lens L6-6 having a positive refractive power.

According to various embodiments, the optical lens assembly 100-6 may include a front group FG, an intermediate group MG, and a rear group RG. In the present embodiment, descriptions about components similar to those of the fifth numerical example will be omitted. The optical lens assembly 100-6 may include a front group FG, an intermediate group MG, and a rear group RG. The front group FG may include the first lens L1-6 and the second lens L2-6, the intermediate group MG may include the third lens L3-6 and the fourth lens L4-6, and the rear group RG may include the fifth lens L5-6 and the sixth lens L6-6. The optical lens assembly 100-6 according to the sixth numerical example may include an aperture stop ST at an image side of the second lens L2-2.

According to various embodiments, the optical lens assembly 100-6 may have a viewing angle smaller than 60°. For example, the optical lens assembly 100-6 may have a viewing angle that is greater than 28° and less than 60°.

Figure 13:
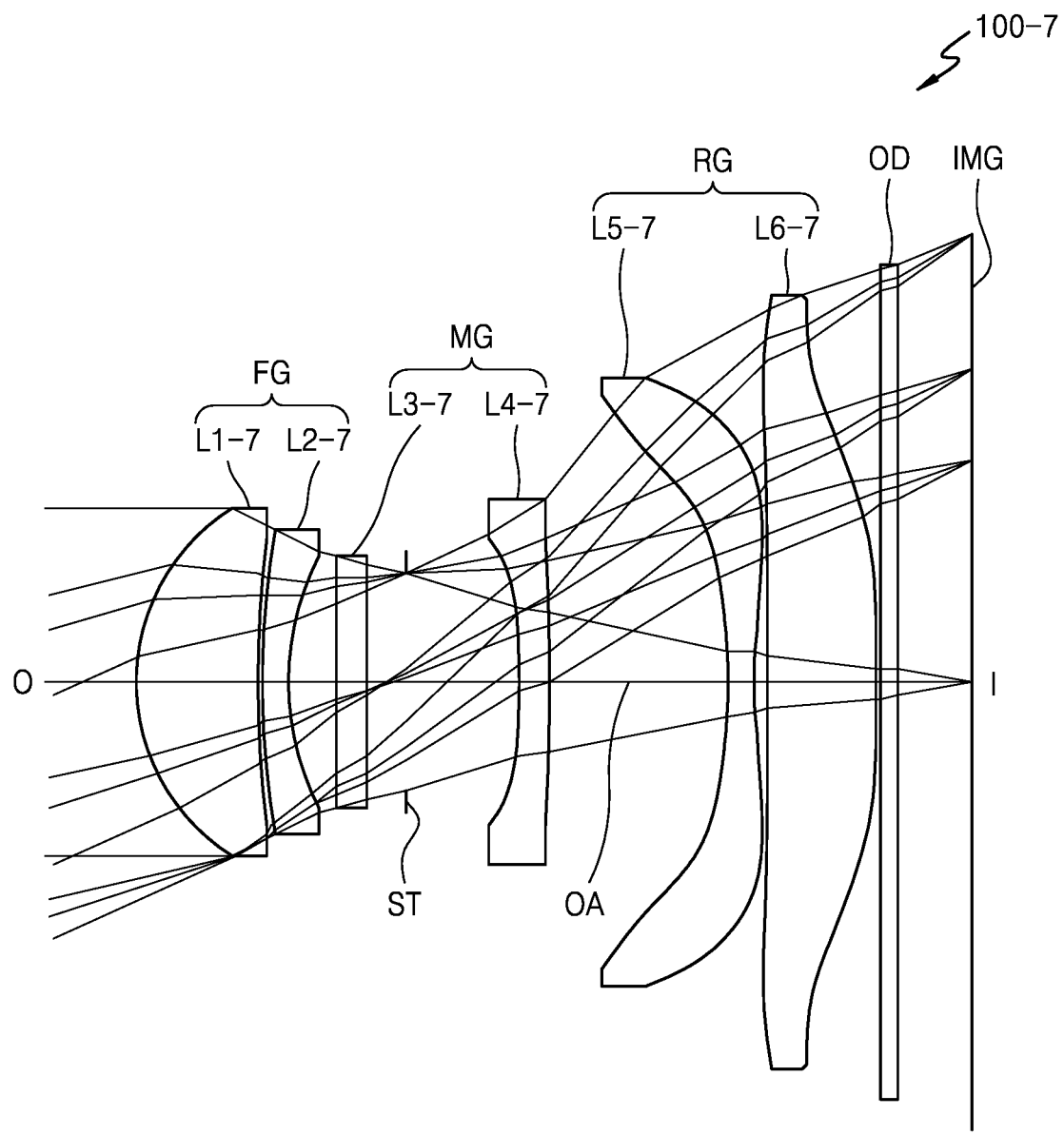
FIG. 13 is a diagram of an optical lens assembly of a seventh numerical example, according to one or more embodiments.

FIG. 13 is a diagram of an optical lens assembly 100-7 of a seventh numerical example, according to various embodiments. According to various embodiments, the optical lens assembly 100-7 may include, sequentially from an object side O to an image side I, a first lens L1-7 having a positive refractive power, a second lens L2-7 having a negative refractive power, a third lens L3-7, a fourth lens L4-7, a fifth lens L5-7 having a negative refractive power, and a sixth lens L6-7 having a positive refractive power.

According to various embodiments, the optical lens assembly 100-7 may include a front group FG, an intermediate group MG, and a rear group RG. The front group FG may include the first lens L1-7 and the second lens L2-7, the intermediate group MG may include the third lens L3-7 and the fourth lens L4-7, and the rear group RG may include the fifth lens L5-7 and the sixth lens L6-7. In the present embodiment, descriptions about components similar to those of the fifth numerical example will be omitted.

The optical lens assembly 100-7 according to the seventh numerical example may include an aperture stop ST between the third lens L3-7 and the fourth lens L4-7.

According to various embodiments, the optical lens assembly 100-7 may have a viewing angle smaller than 60°. For example, the optical lens assembly 100-7 may have a viewing angle that is less than 49°. For example, the optical lens assembly 100-7 may have a viewing angle that is greater than 28° and less than 60°. For example, the optical lens assembly 100-7 may have a viewing angle that is greater than 28° and less than 49°.

Figure 15:
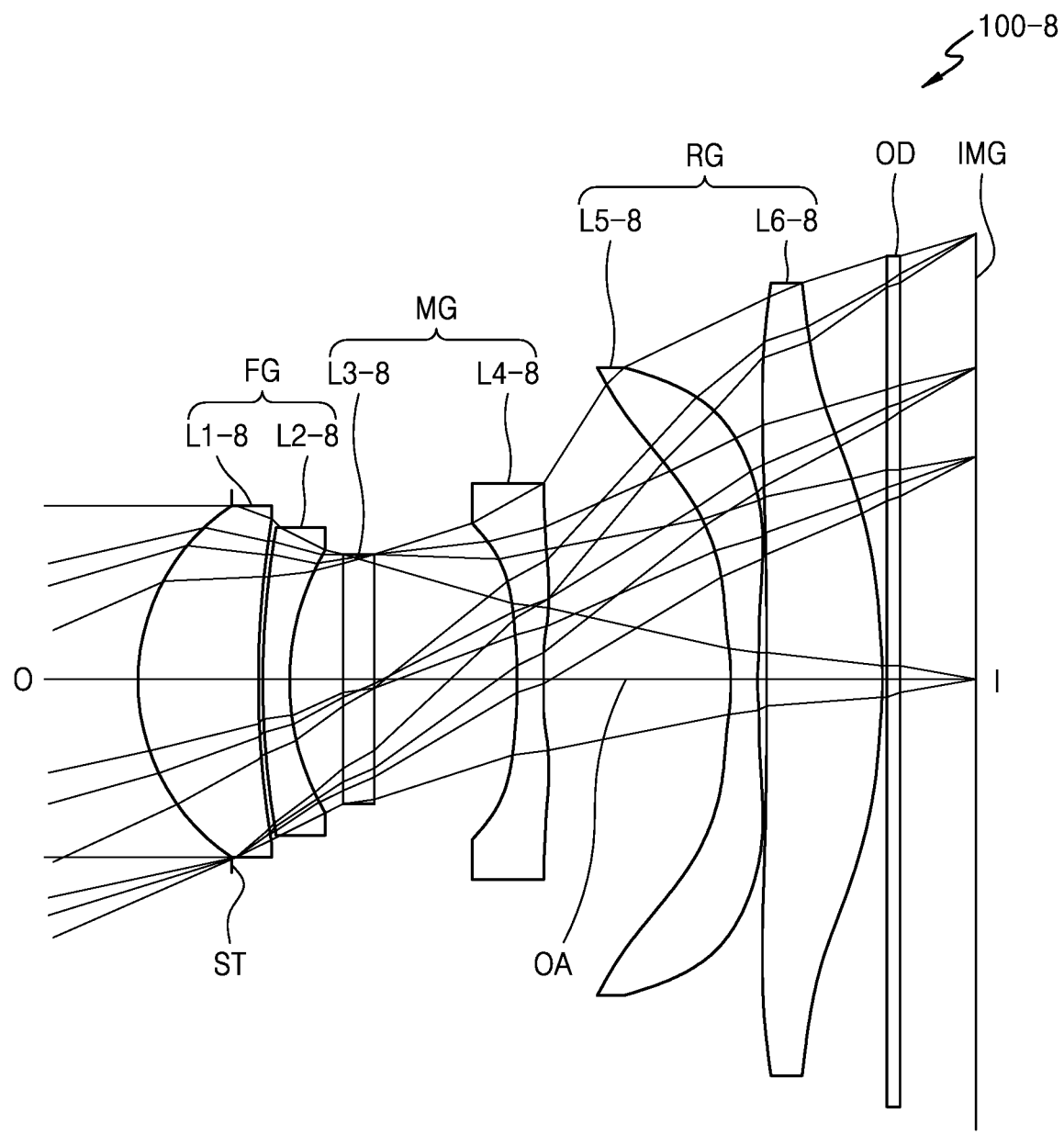
FIG. 15 is a diagram of an optical lens assembly of an eighth numerical example, according to various embodiments.

FIG. 15 is a diagram of an optical lens assembly 100-8 of an eighth numerical example, according to various embodiments.

According to various embodiments, the optical lens assembly 100-8 may include, sequentially from an object side O to an image side I, a first lens L1-8 having a positive refractive power, a second lens L2-8 having a negative refractive power, a third lens L3-8, a fourth lens L4-8, a fifth lens L5-8 having a negative refractive power, and a sixth lens L6-8 having a positive refractive power.

According to various embodiments, the optical lens assembly 100-8 may include a front group FG, an intermediate group MG, and a rear group RG. The front group FG of the optical lens assembly 100-8 may include the first lens L1-8 and the second lens L2-8, the intermediate group MG may include the third lens L3-8 and the fourth lens L4-8, and the rear group RG may include the fifth lens L5-8 and the sixth lens L6-8. In the present embodiment, descriptions about components similar to those of the fifth numerical example will be omitted.

The optical lens assembly 100-8 according to the eighth numerical example may include an aperture stop ST at an object side O of the first lens L1-8.

According to various embodiments, the optical lens assembly 100-8 may have a viewing angle smaller than 60°. For example, the optical lens assembly 100-8 may have a viewing angle that is less than 49°. For example, the optical lens assembly 100-8 may have a viewing angle that is greater than 28° and less than 60°. For example, the optical lens assembly 100-7 may have a viewing angle that is greater than 28° and less than 49°.

Figure 17:
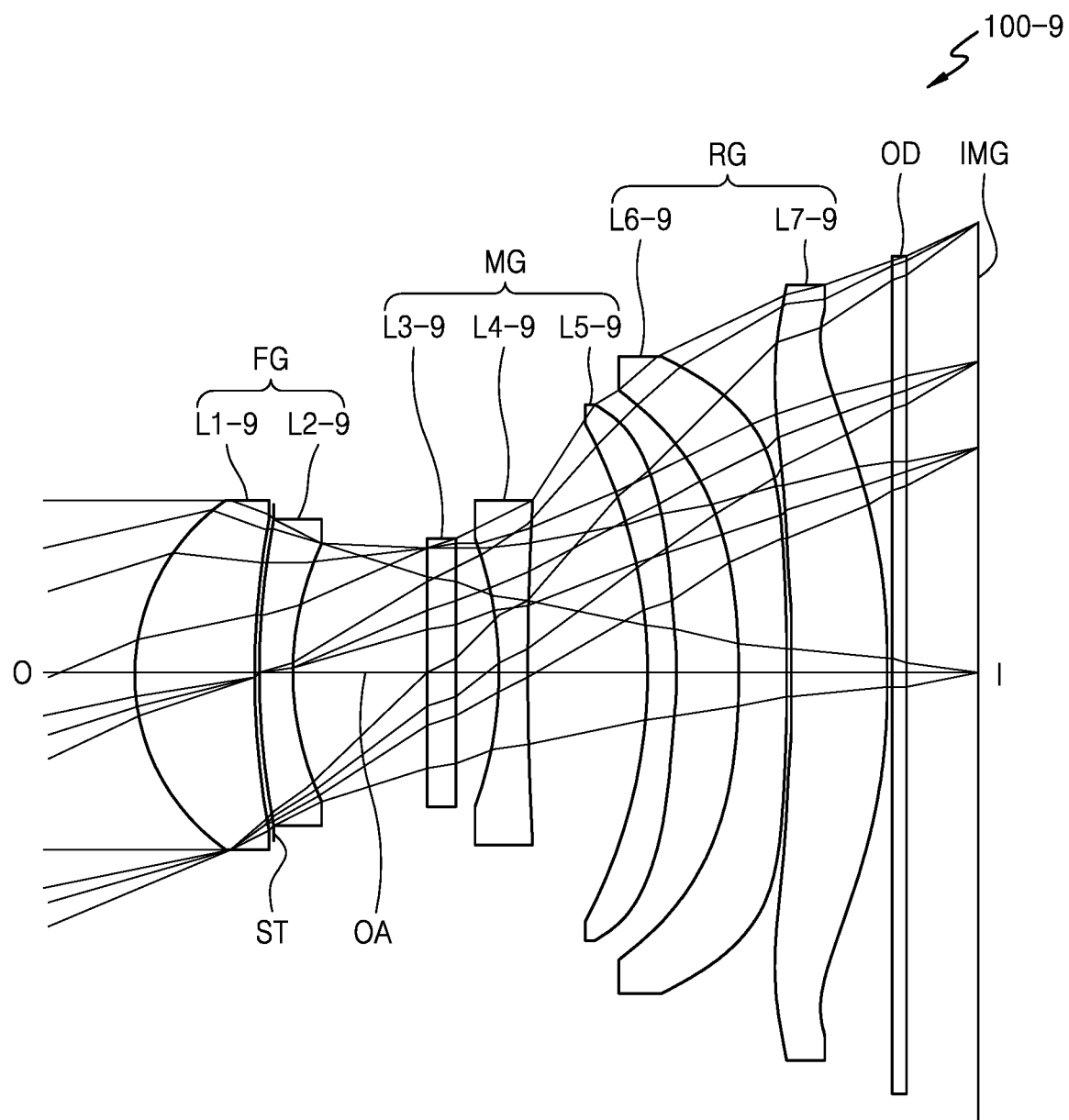
FIG. 17 is a diagram of an optical lens assembly of a ninth numerical example, according to one or more embodiments.

FIG. 17 is a diagram of an optical lens assembly 100-9 of a ninth numerical example, according to various embodiments.

According to various embodiments, the optical lens assembly 100-9 may include, sequentially from an object side O to an image side I, a first lens L1-9 having a positive refractive power, a second lens L2-9 having a negative refractive power, a third lens L3-9, a fourth lens L4-9, a fifth lens L5-9, a sixth lens L6-9 having a negative refractive power, and a seventh lens L7-9 having a positive refractive power.

According to various embodiments, the optical lens assembly 100-9 may include, for example, a front group FG, an intermediate group MG, and a rear group RG. According to various embodiments, a front group FG of the optical lens assembly 100-9 may include the first lens L1-9 having the positive refractive power, and the second lens L2-9 having the negative refractive power. The first lens L1-9 may have a concave image side surface. The first lens L1-9 may be a meniscus lens that is concave towards the image side. The second lens L2-9 may include a concave image side surface. The second lens L2-9 may be a meniscus lens that is concave towards the image side.

According to various embodiments, the intermediate group MG may include, for example, three lenses. The intermediate group MG may include the third lens L3-9 having the negative refractive power. The third lens L3-9 may be, for example, a meniscus lens that is convex towards the object side around the optical axis. For example, the fourth lens L4-9 may have a concave image side surface. The fifth lens L5-9 may be, for example, a meniscus lens convex towards the image side. However, the present disclosure is not limited thereto, but each of the third lens L3-9, the fourth lens L4-9, and the fifth lens L5-9 may have a positive or negative refractive power.

According to various embodiments, the rear group RG may include, for example, the sixth lens L6-9 having a negative refractive power, and the seventh lens L7-9 having a positive refractive power. For example, each of the sixth lens L6-9 and the seventh lens L7-9 may be an aspherical lens. The sixth lens L6-9 may have at least one inflection point in an image side surface. The seventh lens L7-9 may have at least one inflection point in an image side surface. For example, an object side surface of the seventh lens L7-9 may be convex. For example, the image side surface of the seventh lens L7-9 may be convex around the optical axis and may be concave away from the optical axis.

According to various embodiments, at least one of the first to seventh lenses may include an aspherical lens. For example, at least one of the first to seventh lens may include at least one aspherical surface. For example, each of the first to seventh lenses may be an aspherical lens. At least one of the first to seventh lenses may include a plastic lens. For example, each of the first to seventh lenses may be a plastic lens.

According to various embodiments, an optical lens assembly 100-9 according to a ninth numerical example may include an aperture stop ST at an object side of the second lens L2-9.

According to various embodiments, the optical lens assembly 100-9 may have a viewing angle smaller than 60°. For example, the optical lens assembly 100-9 may have a viewing angle that is less than 49°. For example, the optical lens assembly 100-9 may have a viewing angle that is greater than 28° and less than 60°. For example, the optical lens assembly 100-9 may have a viewing angle that is greater than 28° and less than 49°.

Figure 19:
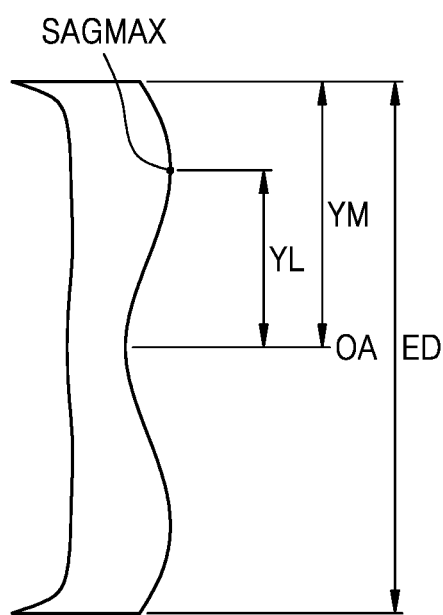
FIG. 19 is a diagram illustrating YL and YM values used in the optical lens assembly.

FIG. 19 is a diagram illustrating YL and YM values used in the optical lens assembly, according to various embodiments.

The optical lens assembly according to the various embodiments may satisfy following condition.

$0 \leq YL/YM < 0.4$ <Condition 1>

Here, YL may denote, for example, a distance from an optical axis OA to a maximum sag in an image side surface of a lens that is closest to the image side, and YM may denote ½ of an effective diameter ED of the image side surface of the lens closest to the image side. Also, YL may denote, for example, a perpendicular distance from the optical axis OA to a maximum sag (sagmax) in the image side surface of the lens, and YM may denote ½ of the effective diameter ED of the image side surface of the lens.

According to various embodiments, when a value of (YL/YM) satisfies the above condition 1, aberration may be sufficiently corrected.

The optical lens assembly according to the various embodiments may satisfy following condition.

$0 < FOV < 60$ (Degree) <Condition 2>

Here, FOV may denote a viewing angle of the optical lens assembly.

For example, the optical lens assembly according to various embodiments may satisfy following condition.

$28 < FOV < 60$ (Degree) <Condition 3>

For example, the optical lens assembly according to various embodiments may satisfy following condition.

$0 < FOV < 49$ (Degree) <Condition 4>

For example, the optical lens assembly according to various embodiments may satisfy following condition.

$35 < FOV < 49$ (Degree) <Condition 5>

The optical lens assembly according to various embodiments may have a narrow viewing angle, a reinforced telephoto performance, and a small size. The narrow viewing angle may include, for example, a viewing angle less than 60, and the telephoto performance may include at least some of the functions related to the telephoto lens.

For example, the optical lens assembly according to various embodiments may satisfy following condition.

$0 < F1/EFL < 10$ <Condition 6> where F1 denotes a focal length of the first group, and EFL denotes a focal length of the optical lens assembly. The front group FG may have a positive refractive power, and may refract light beams that are incident in parallel to be converged to a next lens group.

For example, the optical lens assembly according to various embodiments may satisfy following condition.

$0 < F11/EFL < 1$ <Condition 7>

Here, F11 denotes a focal length of a lens closest to the object side in the front group, that is, the first lens, and EFL denotes a focal length of the optical lens assembly. When the lens closest to the object side in the front group has a strong positive refractive power, the incident light may be focused, and as such, a total length may be reduced.

The optical lens assembly according to various embodiments may satisfy following condition.

$20 < Vd12 < 30$ <Condition 8>

Here, Vd12 denotes an Abbe's number of the second lens.

When a value of Vd12 satisfies the above condition 8, aberration, for example, chromatic aberration may be sufficiently corrected.

$-100 < F2/EFL < 0$ <Condition 9>

Here, F2 denotes a focal length of the intermediate group MG, and EFL denotes a focal length of the optical lens assembly. The intermediate group has a negative refractive power, and when a value of (F2/EFL) satisfies the above condition 9, the aberration may be sufficiently corrected.

The optical lens assembly according to various embodiments may satisfy following condition.

$-100 < F3/EFL < 0$ <Condition 10> where F3 denotes a focal length of the rear group, and EFL denotes a focal length of the optical lens assembly. When the rear group has a positive refractive power or a negative refractive power and satisfies the above condition 10, a light beam from the intermediate group may be isolated as different image heights according to incident angle. The lenses included in the rear group may each have at least one inflection point in order to reduce an entire length of the lens. In addition, the lenses in the rear group may include at least one aspherical lens in order to improve optical performance.

$$-100 < F31/EFL < 0 \qquad \text{<Condition 11>}$$

Here, F31 denotes a focal length of a second lens from the image side in the rear group, and EFL denotes a focal length of the optical lens assembly. That is, the second lens from the image side in the rear group may have a negative refractive power.

$$0.5 < F32/EFL < 100 \qquad \text{<Condition 12>}$$

Here, F32 denotes a focal length of a lens closest to the image side in the rear group, and EFL denotes a focal length of the optical lens assembly. When a value of (F32/EFL) satisfies the above condition 12, a total length of the optical lens assembly may be reduced.

The optical lens assembly according to the example embodiment may have a compact size, a telephoto performance, and high resolution. The optical lens assembly may be mounted in, for example, a mobile terminal, and may be applied to a digital camera or camcorder, a personal computer, or other electronic appliances.

The aspherical surface used in the optical lens assembly according to various embodiments of the present disclosure may be defined as follows.

The aspherical surface shape may be defined by following equation, when it is assumed that an optical axis direction is an x-axis, a direction perpendicular to the optical axis direction is y-axis, and a proceeding direction of a light ray is positive direction. Here, x denotes a distance from a vertex of the lens along the optical axis, y denotes a distance in a direction perpendicular to the optical axis, K denotes a conic constant, A, B, C, D . . . denote aspherical coefficients, and c denotes a reciprocal number of the radius of curvature (1/R) at the vertex of the lens.

$$x = \frac{cy^2}{1 + \sqrt{1 - (K+1)c^2y^2}} + Ay^4 + By^6 + Cy^8 + Dy^{10} + \ldots \qquad \text{<Equation 13>}$$

The optical lens assembly may be implemented via the numerical examples according to various designs as follows.

In each of the numerical examples, the lens surfaces (1, 2, 3 . . . n; n is a natural number) are numbered sequentially in a row from the object side O to the image side I. In addition, EFL denotes a focal length of the optical lens assembly, F-number denotes F number, FOV denotes a viewing angle, R denotes a radius of curvature, Dn denotes a thickness of a lens or air space between lenses, Nd denotes a refractive index, and Vd denotes Abbe's number. ST denotes an aperture stop, and * denotes an aspherical surface.

First Numerical Example

FIG. 1 is a diagram of an optical lens assembly of a first numerical example, according to various embodiments, and Table 1 denotes design data of, for example, the first numerical example.

EFL=6.90 mm, FOV=46 degrees

TABLE 1

| lens surface | R (mm) | Dn (mm) | Nd | Vd | Effective diameter (mm) |
| --- | --- | --- | --- | --- | --- |
| 1* | 1.328 | 0.603 | 1.534 | 55.7 | 1.9 |
| 2* | 6.817 | 0.226 | 0.000 | 0.0 | 1.7 |
| 3* | −319.518 | 0.212 | 1.658 | 21.5 | 1.5 |
| 4* (ST) | 3.313 | 2.720 | 0.000 | 0.0 | 1.3 |
| 5* | −2.050 | 0.300 | 1.547 | 56.1 | 2.9 |
| 6* | 16.110 | 0.109 | 0.000 | 0.0 | 4.0 |
| 7* | 6.189 | 0.828 | 1.658 | 21.5 | 5.2 |
| 8* | 20.000 | 0.030 | 0.000 | 0.0 | 5.1 |
| 9 | infinity | 0.110 | 1.517 | 64.2 | 5.5 |
| 10 | infinity | 0.520 | | | 5.6 |
| IMG | | −0.020 | | | 5.9 |

Table 2 illustrates aspherical coefficients in the first numerical example.

TABLE 2

| lens surface | R | K | A | B | C | D | E | F | G |
| --- | --- | --- | --- | --- | --- | --- | --- | --- | --- |
| 1* | 1.328 | 0.00E+00 | 6.11E−04 | 3.01E−02 | 1.05E−02 | −2.63E−02 | 3.78E−02 | 0.00E+00 | 0.00E+00 |
| 2* | 6.817 | −3.52E+00 | 6.52E−02 | 2.89E−02 | 4.75E−02 | −8.15E−02 | 0.00E+00 | 0.00E+00 | 0.00E+00 |
| 3* | −319.518 | −4.61E+25 | 1.93E−01 | −8.94E−03 | −2.00E−01 | 7.59E−03 | −9.36E−03 | 1.12E−02 | 0.00E+00 |
| 4* | 3.313 | 9.40E+00 | 2.00E−01 | 3.71E−02 | −9.79E−02 | −4.98E−01 | 7.04E−01 | 0.00E+00 | 0.00E+00 |
| 5* | −2.050 | 9.19E−01 | 2.08E−02 | −5.32E−02 | 1.22E−02 | 1.43E−03 | 3.72E−03 | −2.09E−03 | 0.00E+00 |
| 6* | 16.110 | −9.70E+03 | −3.14E−02 | −2.14E−03 | −6.93E−05 | 7.82E−05 | 8.49E−05 | −3.19E−05 | 0.00E+00 |
| 7* | 6.189 | −3.06E+02 | −7.04E−02 | 6.20E−02 | −2.85E−02 | 7.53E−03 | −1.15E−03 | 9.53E−05 | −3.30E−06 |
| 8* | 20.000 | 0.00E+00 | −1.49E−01 | 8.11E−02 | −2.40E−02 | 3.90E−03 | −3.24E−04 | 1.08E−05 | 0.00E+00 |

Figure 2:
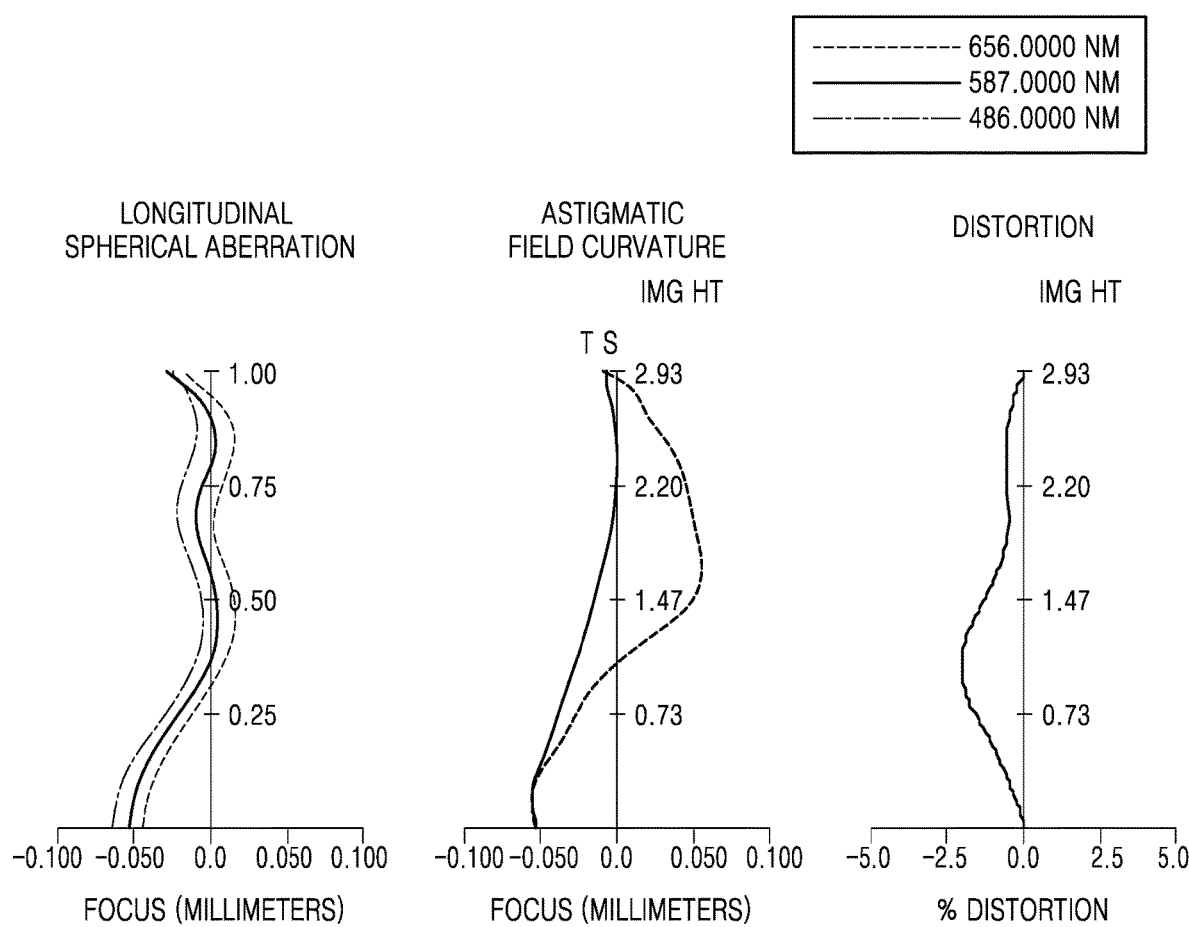
FIG. 2 is an aberration diagram of the optical lens assembly of the first numerical example, according to various embodiments.

FIG. 2 shows a longitudinal spherical aberration, an astigmatic field curvatures, and a distortion of the optical lens assembly according to the first numerical example of the present disclosure. The longitudinal spherical aberration is shown with respect to the light having a wavelength of, for example, 656.0000 NM (nanometer), 587.0000 NM, and 486.0000 NM, and as the astigmatic field curvatures, a tangential field curvature (T) and a sagital field curvature (S) are shown. The astigmatic field curvatures are shown with respect to the light having a wavelength of 587.0000 NM, and the distortion is shown with respect to the light having a wavelength of 587.0000 NM.

Second Numerical Example

FIG. 3 shows an optical lens assembly of the second numerical example, according to various embodiments, and Table 3 shows design data of the second numerical example, for example.

EFL=5.415 mm; FOV=56 degrees

TABLE 3

| lens surface | R (mm) | Dn (mm) | Nd | Vd | Effective diameter (mm) |
|---|---|---|---|---|---|
| 1* | 1.239 | 0.612 | 1.547 | 56.1 | 1.9 |
| 2* | 7.613 | 0.030 | | | 1.5 |
| 3* | 163.030 | 0.236 | 1.658 | 21.5 | 1.4 |
| 4* (ST) | 3.488 | 1.585 | | | 1.1 |
| 5* | −5.127 | 1.265 | 1.547 | 56.1 | 2.3 |
| 6* | 4.907 | 0.125 | | | 4.3 |
| 7* | 28.221 | 0.710 | 1.642 | 23.9 | 4.7 |
| 8* | −49.849 | 0.030 | | | 5.1 |
| 9 | infinity | 0.110 | 1.517 | 64.2 | 5.4 |
| 10 | infinity | 0.480 | | | 5.5 |
| IMG | | 0.020 | | | 5.9 |

Table 4 illustrates aspherical coefficients in the second numerical example.

TABLE 4

| lens surface | R | K | A | B | C | D | E | F | G |
|---|---|---|---|---|---|---|---|---|---|
| 1* | 1.239 | 0.00E+00 | 5.95E−03 | 1.26E−02 | 8.66E−03 | −1.83E−02 | 3.59E−02 | 0.00E+00 | 0.00E+00 |
| 2* | 7.613 | 2.28E+01 | 7.41E−02 | 3.03E−02 | 1.49E−02 | −1.19E−01 | 0.00E+00 | 0.00E+00 | 0.00E+00 |
| 3* | 163.030 | 0.00E+00 | 1.67E−01 | 2.37E−02 | −1.36E−01 | 4.13E−02 | −9.36E−03 | 1.12E−02 | 0.00E+00 |
| 4* | 3.488 | 9.92E+01 | 1.73E−01 | 9.17E−02 | −2.10E−01 | 9.17E−02 | 7.04E−01 | 0.00E+00 | 0.00E+00 |
| 5* | −5.127 | 1.48E+01 | −6.65E−02 | −2.95E−02 | 1.32E−02 | −1.30E−03 | −7.47E−04 | −4.88E−03 | 0.00E+00 |
| 6* | 4.907 | 3.45E+00 | −5.39E−02 | 4.72E−03 | −1.25E−03 | −6.60E−05 | 7.36E−05 | −1.21E−05 | 0.00E+00 |
| 7* | 28.221 | −6.96E+03 | −7.38E−02 | 6.25E−02 | −2.85E−02 | 7.53E−03 | −1.15E−03 | 9.53E−05 | −3.34E−06 |
| 8* | −49.849 | −4.61E+28 | −1.32E−01 | 7.95E−02 | −2.40E−02 | 3.90E−03 | −3.25E−04 | 1.07E−05 | 0.00E+00 |

Figure 4:
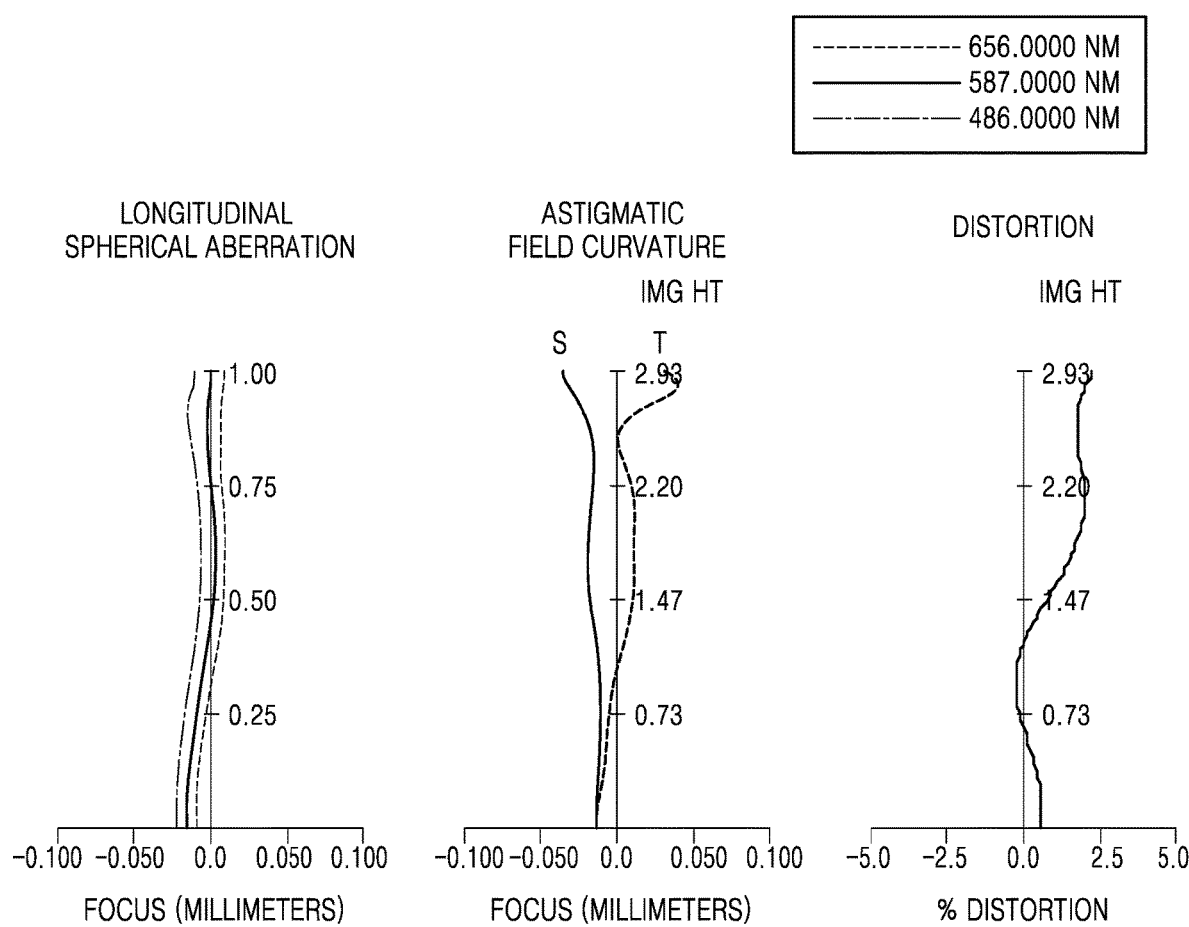
FIG. 4 is an aberration diagram of the optical lens assembly of the second numerical example, according to various embodiments.

FIG. 4 shows a longitudinal spherical aberration, an astigmatic field curvatures, and a distortion of the optical lens assembly according to the second numerical example of the present disclosure.

Third Numerical Example

FIG. 5 shows an optical lens assembly of the third numerical example, according to various embodiments, and Table 5 shows design data of the third numerical example, for example.

EFL=6.90 mm, FOV=46 degrees

TABLE 5

| lens surface | R (mm) | Dn (mm) | Nd | Vd | Effective diameter (mm) |
|---|---|---|---|---|---|
| 1* | 1.386 | 0.748 | 1.534 | 55.7 | 2.2 |
| 2* | 22.580 | 0.030 | | | 1.9 |
| 3* | 10.725 | 0.200 | 1.658 | 21.5 | 1.9 |
| 4* (ST) | 2.637 | 1.274 | | | 1.6 |
| 5* | −95.347 | 0.280 | 1.547 | 56.1 | 2.0 |
| 6* | 4.140 | 1.347 | | | 2.5 |
| 7* | −4.096 | 0.300 | 1.547 | 56.1 | 4.0 |
| 8* | 5.645 | 0.030 | | | 4.4 |
| 9* | 6.194 | 0.801 | 1.642 | 23.9 | 5.2 |
| 10* | −122.875 | 0.030 | | | 5.2 |
| 11 | infinity | 0.110 | 1.517 | 64.2 | 5.5 |
| 12 | infinity | 0.520 | | | 5.5 |
| IMG | | −0.020 | | | 5.9 |

Table 6 illustrates aspherical coefficients in the third numerical example.

TABLE 6

| lens surface | R | K | A | B | C | D | E | F | G |
|---|---|---|---|---|---|---|---|---|---|
| 1* | 1.386 | 0.00E+00 | 5.55E−04 | 4.32E−03 | 1.35E−02 | −1.62E−02 | 9.43E−03 | 0.00E+00 | 0.00E+00 |
| 2* | 22.580 | −5.19E+02 | 5.11E−02 | −1.76E−02 | 3.90E−02 | −1.92E−02 | 0.00E+00 | 0.00E+00 | 0.00E+00 |
| 3* | 10.725 | 2.43E+01 | 1.75E−02 | 2.34E−02 | 2.75E−03 | 2.09E−03 | 7.39E−03 | −6.30E−03 | 0.00E+00 |
| 4* | 2.637 | −3.10E−01 | 2.83E−02 | 3.33E−02 | 1.73E−01 | −3.31E−01 | 3.14E−01 | 0.00E+00 | 0.00E+00 |
| 5* | −95.347 | −2.11E+16 | −1.88E−01 | 2.03E−02 | −3.47E−02 | 7.33E−02 | −5.07E−02 | 0.00E+00 | 0.00E+00 |
| 6* | 4.140 | 4.57E+00 | −1.38E−01 | 4.40E−02 | 8.80E−03 | 5.13E−04 | −2.77E−03 | 0.00E+00 | 0.00E+00 |
| 7* | −4.096 | 1.07E+00 | −9.08E−03 | −3.09E−02 | 1.62E−02 | −2.74E−03 | 1.92E−04 | −6.76E−06 | 0.00E+00 |

TABLE 6-continued

| lens surface | R | K | A | B | C | D | E | F | G |
|---|---|---|---|---|---|---|---|---|---|
| 8* | 5.645 | −5.78E+01 | −2.98E−02 | 1.61E−03 | −1.00E−03 | 1.43E−04 | 1.22E−05 | −4.91E−06 | 0.00E+00 |
| 9* | 6.194 | −7.48E+01 | −7.26E−02 | 6.26E−02 | −2.85E−02 | 7.53E−03 | −1.15E−03 | 9.54E−05 | −3.38E−06 |
| 10* | −122.875 | −1.29E+26 | −1.36E−01 | 7.77E−02 | −2.35E−02 | 3.92E−03 | −3.26E−04 | 1.03E−05 | 0.00E+00 |

Figure 6:
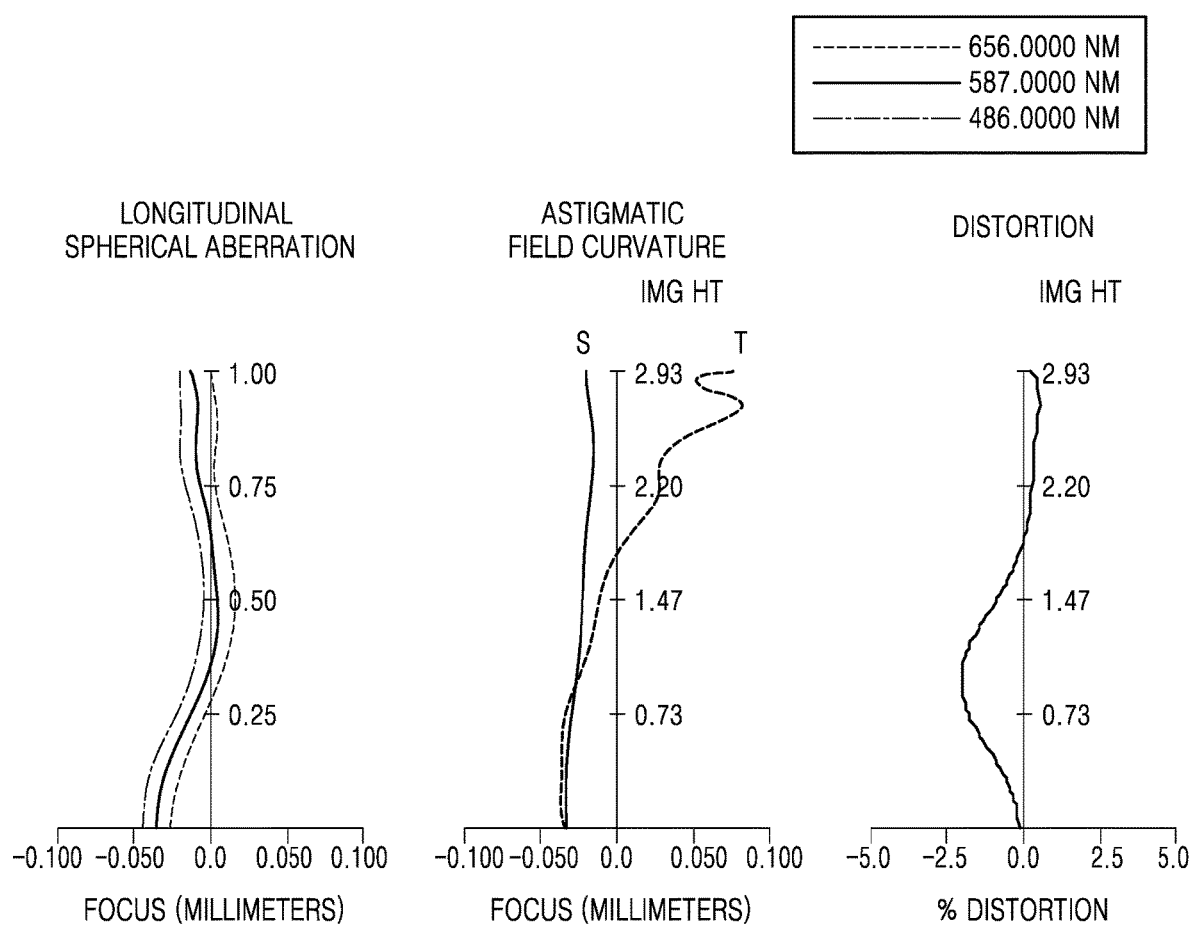
FIG. 6 is an aberration diagram of the optical lens assembly of the third numerical example, according to various embodiments.

FIG. 6 shows a longitudinal spherical aberration, an astigmatic field curvatures, and a distortion of the optical lens assembly according to the third numerical example of the present disclosure.

Fourth Numerical Example

FIG. 7 shows an optical lens assembly of the fourth numerical example, according to various embodiments, and Table 7 shows design data of the fourth numerical example, for example.

EFL=5.605 mm; FOV=54 degrees

TABLE 7

| lens surface | R (mm) | Dn (mm) | Nd | Vd | Effective diameter (mm) |
|---|---|---|---|---|---|
| 1* | 1.391 | 0.723 | 1.534 | 55.7 | 2.2 |
| 2* | 17.491 | 0.030 | | | 1.8 |
| 3* | 16.288 | 0.319 | 1.658 | 21.5 | 1.8 |
| 4* (ST) | 2.979 | 1.003 | | | 1.3 |
| 5* | 170.801 | 0.328 | 1.547 | 56.1 | 2.0 |
| 6* | 6.143 | 0.544 | | | 2.5 |
| 7* | 17.822 | 1.152 | 1.547 | 56.1 | 3.0 |
| 8* | 3.463 | 0.173 | | | 4.6 |
| 9* | 14.397 | 0.610 | 1.642 | 23.9 | 5.2 |
| 10* | −93.616 | 0.030 | | | 5.1 |
| 11 | infinity | 0.110 | 1.517 | 64.2 | 5.5 |
| 12 | infinity | 0.480 | | | 5.5 |
| IMG | | 0.020 | | | 5.9 |

Table 8 illustrates aspherical coefficients in the fourth numerical example.

Figure 8:
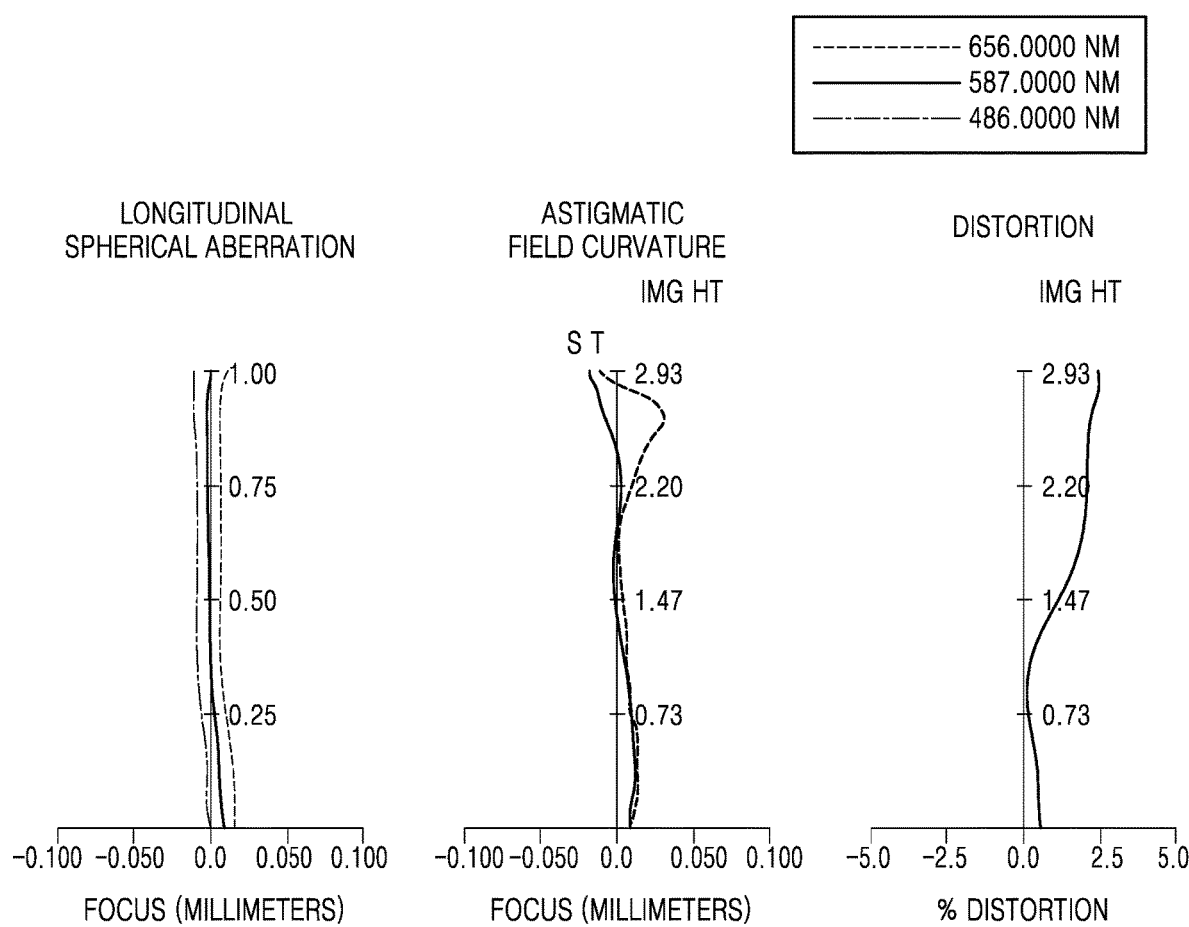
FIG. 8 is an aberration diagram of the optical lens assembly of the fourth numerical example, according to one or more embodiments.

FIG. 8 shows a longitudinal spherical aberration, an astigmatic field curvatures, and a distortion of the optical lens assembly according to the fourth numerical example of the present disclosure.

Fifth Numerical Example

FIG. 9 shows an optical lens assembly of the fifth numerical example, according to various embodiments, and Table 9 shows design data of the fifth numerical example, for example.

EFL=6.75 mm; F-number=2.8; FOV=46 degrees

TABLE 9

| lens surface | R (mm) | Dn (mm) | Nd | Vd | Effective diameter (mm) |
|---|---|---|---|---|---|
| 1* | 1.453 | 0.823 | 1.547 | 56.1 | 2.4 |
| 2* | 24.973 | 0.031 | | | 2.1 |
| 3* | 12.765 | 0.200 | 1.658 | 21.5 | 2.1 |
| 4* (ST) | 2.754 | 1.384 | | | 1.8 |
| 5* | −21.500 | 0.200 | 1.547 | 56.1 | 2.0 |
| 6* | 5.347 | 0.787 | | | 2.3 |
| 7* | −5.006 | 0.250 | 1.547 | 56.1 | 3.4 |
| 8* | −5.273 | 0.385 | | | 3.6 |
| 9* | −4.680 | 0.300 | 1.547 | 56.1 | 3.8 |
| 10* | 17.873 | 0.030 | | | 4.3 |
| 11* | 12.618 | 0.680 | 1.658 | 21.5 | 5.0 |
| 12* | 174.451 | 0.030 | | | 5.1 |
| 13 | infinity | 0.110 | 1.517 | 64.2 | 5.4 |
| 14 | infinity | 0.503 | | | 5.5 |
| IMG | | −0.013 | | | 5.9 |

Table 10 illustrates aspherical coefficients in the fifth numerical example.

TABLE 8

| lens surface | R | K | A | B | C | D | E | F | G |
|---|---|---|---|---|---|---|---|---|---|
| 1* | 1.391 | 0.00E+00 | 3.85E−03 | −1.48E−03 | 1.32E−02 | −1.39E−02 | 9.49E−03 | 0.00E+00 | 0.00E+00 |
| 2* | 17.491 | −1.38E+03 | 4.90E−02 | −1.76E−02 | 4.28E−02 | −1.04E−02 | 0.00E+00 | 0.00E+00 | 0.00E+00 |
| 3* | 16.288 | 8.88E+01 | 2.17E−02 | 2.67E−02 | 3.09E−03 | 6.65E−04 | 2.66E−03 | 2.39E−03 | 0.00E+00 |
| 4* | 2.979 | 2.20E+00 | 4.64E−02 | 2.52E−02 | 1.37E−01 | −3.00E−01 | 3.50E−01 | 0.00E+00 | 0.00E+00 |
| 5* | 170.801 | −2.11E+16 | −1.64E−01 | 3.05E−03 | −2.51E−02 | 5.41E−02 | −3.82E−02 | 0.00E+00 | 0.00E+00 |
| 6* | 6.143 | −5.57E+00 | −1.55E−01 | 2.43E−02 | 6.13E−03 | 3.15E−03 | −1.62E−03 | 0.00E+00 | 0.00E+00 |
| 7* | 17.822 | −8.81E+02 | −6.28E−02 | −3.05E−02 | 1.69E−02 | −2.64E−03 | 1.76E−04 | −2.24E−05 | 0.00E+00 |
| 8* | 3.463 | −1.11E+01 | −2.91E−02 | 1.73E−03 | −9.60E−04 | 1.33E−04 | 1.21E−05 | −3.63E−06 | 0.00E+00 |
| 9* | 14.397 | −8.94E+02 | −7.71E−02 | 6.23E−02 | −2.85E−02 | 7.54E−03 | −1.15E−03 | 9.52E−05 | −3.39E−06 |
| 10* | −93.616 | −1.29E+26 | −1.31E−01 | 7.62E−02 | −2.35E−02 | 3.93E−03 | −3.25E−04 | 1.02E−05 | 0.00E+00 |

TABLE 10

| lens surface | R | K | A | B | C | D | E | F | G |
|---|---|---|---|---|---|---|---|---|---|
| 1* | 1.453 | −1.10E−02 | 4.07E−03 | −1.92E−03 | 1.53E−02 | −1.40E−02 | 6.76E−03 | 0.00E+00 | 0.00E+00 |
| 2* | 24.973 | 0.00E+00 | 6.16E−02 | −6.21E−02 | 1.04E−01 | −7.20E−02 | 1.76E−02 | 4.68E−04 | 0.00E+00 |
| 3* | 12.765 | 5.94E+01 | 3.66E−02 | −3.40E−02 | 1.03E−01 | −9.66E−02 | 3.80E−02 | −1.89E−03 | 0.00E+00 |
| 4* | 2.754 | −9.50E−02 | 3.46E−02 | −1.63E−02 | 4.63E−01 | −1.50E+00 | 2.85E+00 | −2.81E+00 | 1.19E+00 |
| 5* | −21.500 | 6.61E−01 | −2.37E−01 | −2.42E−01 | 1.85E+00 | −4.95E+00 | 6.79E+00 | −4.62E+00 | 1.23E+00 |
| 6* | 5.347 | −9.40E+00 | −2.50E−01 | 3.53E−01 | −4.96E−01 | 4.84E−01 | −2.28E−01 | 3.98E−02 | 0.00E+00 |
| 7* | −5.006 | 5.47E+00 | −2.17E−05 | 1.55E−06 | 1.13E−07 | 3.03E−08 | 5.04E−09 | 1.44E−09 | 0.00E+00 |
| 8* | −5.273 | 6.72E+00 | 6.02E−03 | 5.51E−04 | −7.04E−05 | −6.45E−05 | −9.71E−07 | −1.16E−05 | 0.00E+00 |
| 9* | −4.680 | −1.51E+01 | −3.04E−02 | −1.97E−03 | 6.40E−06 | 1.28E−05 | 7.98E−06 | 2.17E−06 | 0.00E+00 |
| 10* | 17.873 | 1.77E+01 | −1.63E−02 | −3.71E−04 | −1.54E−03 | 1.81E−04 | 7.14E−06 | −4.36E−06 | 0.00E+00 |
| 11* | 12.618 | −6.31E+01 | −7.64E−02 | 6.25E−02 | −2.85E−02 | 7.54E−03 | −1.15E−03 | 9.51E−05 | −3.37E−06 |
| 12* | 174.451 | −1.29E+26 | −1.35E−01 | 7.68E−02 | −2.34E−02 | 3.93E−03 | −3.25E−04 | 1.01E−05 | 0.00E+00 |

Figure 10:
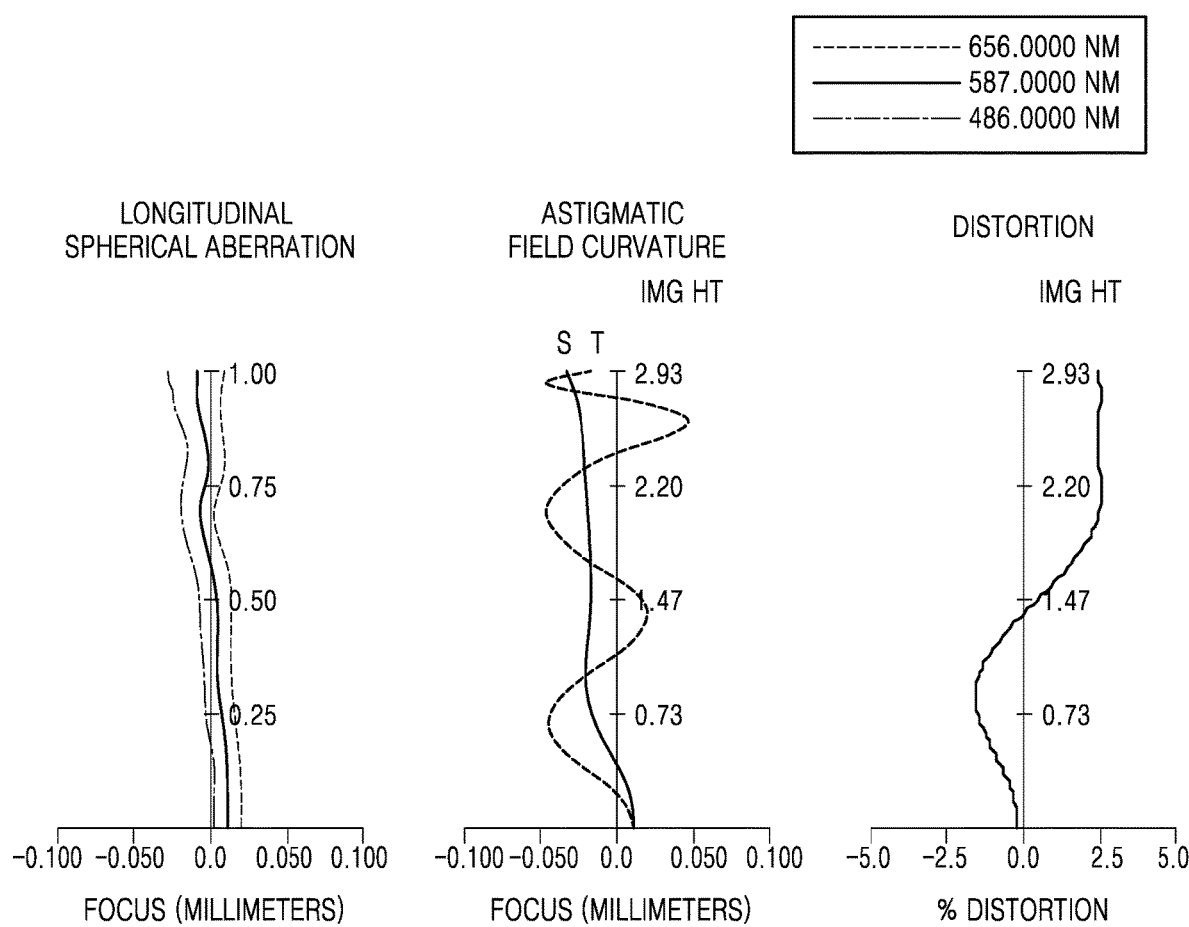
FIG. 10 is an aberration diagram of the optical lens assembly of the fifth numerical example, according to various embodiments.

FIG. 10 shows a longitudinal spherical aberration, an astigmatic field curvatures, and a distortion of the optical lens assembly according to the fifth numerical example of the present disclosure.

Sixth Numerical Example

FIG. 11 shows an optical lens assembly of the sixth numerical example, according to various embodiments, and Table 11 shows design data of the sixth numerical example, for example.

EFL=5.52 mm; F-number=2.8; FOV=55 degrees

TABLE 11

| lens surface | R (mm) | Dn (mm) | Nd | Vd | Effective diameter (mm) |
|---|---|---|---|---|---|
| 1* | 1.461 | 0.843 | 1.547 | 56.1 | 2.4 |
| 2* | 82.619 | 0.036 | | | 1.9 |
| 3* | 12.645 | 0.200 | 1.658 | 21.5 | 1.8 |
| 4* (ST) | 2.608 | 1.044 | | | 1.4 |
| 5* | 6.829 | 0.230 | 1.658 | 21.5 | 1.9 |
| 6* | 4.920 | 0.517 | | | 2.1 |
| 7* | −4.099 | 0.263 | 1.547 | 56.1 | 2.3 |
| 8* | −3.960 | 0.030 | | | 3.0 |
| 9* | −78.570 | 0.879 | 1.547 | 56.1 | 3.3 |
| 10* | 2.539 | 0.190 | | | 4.4 |
| 11* | 6.831 | 0.562 | 1.658 | 21.5 | 4.7 |
| 12* | −80.537 | 0.030 | | | 4.9 |
| 13 | infinity | 0.110 | 1.517 | 64.2 | 5.4 |
| 14 | infinity | 0.487 | | | 5.4 |
| IMG | | 0.003 | | | 5.9 |

Table 12 illustrates aspherical coefficients in the sixth numerical example.

Figure 12:
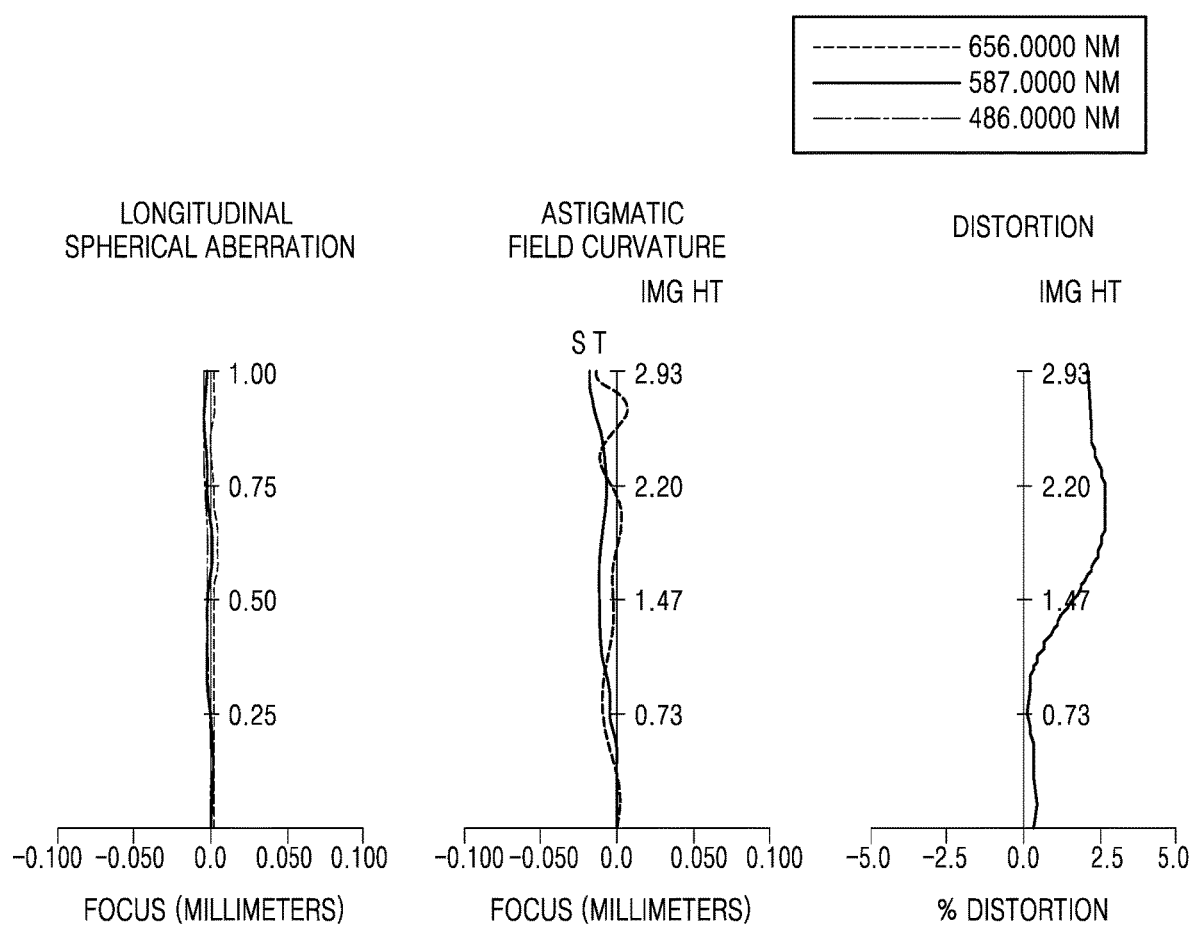
FIG. 12 is an aberration diagram of the optical lens assembly of the sixth numerical example, according to one or more embodiments.

FIG. 12 shows a longitudinal spherical aberration, an astigmatic field curvatures, and a distortion of the optical lens assembly according to the sixth numerical example of the present disclosure.

Seventh Numerical Example

FIG. 13 shows an optical lens assembly of the seventh numerical example, according to various embodiments, and Table 13 shows design data of the seventh numerical example, for example.

EFL=6.67 mm; F-number=2.8; FOV=46 degree

TABLE 13

| lens surface | R (mm) | Dn (mm) | Nd | Vd | Effective diameter (mm) |
|---|---|---|---|---|---|
| 1* | 1.429 | 0.805 | 1.534 | 55.7 | 2.4 |
| 2* | 35.806 | 0.030 | | | 2.2 |
| 3* | 13.624 | 0.190 | 1.658 | 21.5 | 2.1 |
| 4* | 2.720 | 0.314 | | | 1.8 |
| 5* | 51.725 | 0.225 | 1.534 | 55.7 | 1.7 |
| 6* | 67.112 | 0.244 | | | 1.6 |
| 7 (ST) | infinity | 0.782 | | | 1.5 |
| 8* | 22.346 | 0.190 | 1.551 | 52.9 | 2.0 |
| 9* | 3.513 | 1.221 | | | 2.5 |
| 10* | −5.152 | 0.190 | 1.547 | 56.1 | 3.7 |
| 11* | 7.129 | 0.069 | | | 4.1 |
| 12* | 9.218 | 0.759 | 1.658 | 21.5 | 5.1 |
| 13* | 130.445 | 0.030 | | | 5.3 |
| 14 | infinity | 0.110 | 1.517 | 64.2 | 5.6 |
| 15 | infinity | 0.470 | | | 5.7 |
| IMG | | 0.020 | | | 6.1 |

Table 14 illustrates aspherical coefficients in the seventh numerical example.

TABLE 12

| lens surface | R | K | A | B | C | D | E | F | G |
|---|---|---|---|---|---|---|---|---|---|
| 1* | 1.461 | −1.85E−02 | 4.98E−03 | −3.64E−03 | 1.54E−02 | −1.35E−02 | 6.16E−03 | 0.00E+00 | 0.00E+00 |
| 2* | 82.619 | 0.00E+00 | 6.17E−02 | −6.38E−02 | 1.01E−01 | −7.17E−02 | 1.96E−02 | 6.99E−04 | 0.00E+00 |
| 3* | 12.645 | −2.45E+01 | 3.66E−02 | −3.24E−02 | 1.07E−01 | −9.61E−02 | 3.67E−02 | −1.67E−03 | 0.00E+00 |
| 4* | 2.608 | −5.79E−01 | 3.07E−02 | −1.32E−02 | 4.72E−01 | −1.50E+00 | 2.85E+00 | −2.80E+00 | 1.19E+00 |
| 5* | 6.829 | 1.76E+01 | −1.77E−01 | −6.43E−02 | 3.82E−01 | −6.51E−01 | 4.86E−01 | −7.07E−02 | −4.28E−02 |
| 6* | 4.920 | −1.09E+01 | −1.88E−01 | 5.84E−04 | 2.02E−01 | −3.30E−01 | 2.44E−01 | −6.15E−02 | 0.00E+00 |
| 7* | −4.099 | 1.07E+01 | −8.54E−02 | −1.98E−02 | 4.22E−02 | −3.09E−02 | 1.06E−02 | −1.79E−03 | 0.00E+00 |
| 8* | −3.960 | 5.22E+00 | 1.98E−02 | −8.17E−04 | −8.53E−04 | −1.70E−04 | −1.56E−05 | −3.85E−06 | 0.00E+00 |
| 9* | −78.570 | 0.00E+00 | −2.30E−02 | −9.49E−04 | 6.98E−05 | 2.79E−05 | 8.39E−06 | 2.38E−06 | 0.00E+00 |
| 10* | 2.539 | −1.64E+01 | −2.84E−02 | 2.35E−03 | −1.41E−03 | 1.68E−04 | 1.30E−05 | −4.07E−06 | 0.00E+00 |
| 11* | 6.831 | −2.19E+02 | −8.16E−02 | 6.22E−02 | −2.85E−02 | 7.55E−03 | −1.15E−03 | 9.51E−05 | −3.39E−06 |
| 12* | −80.537 | −1.29E+26 | −1.31E−01 | 7.60E−02 | −2.35E−02 | 3.93E−03 | −3.25E−04 | 1.02E−05 | 0.00E+00 |

TABLE 14

| lens surface | R | K | A | B | C | D | E | F | G |
|---|---|---|---|---|---|---|---|---|---|
| 1* | 1.429 | -2.68E-02 | 6.46E-03 | -5.85E-03 | 1.73E-02 | -1.35E-02 | 6.13E-03 | 0.00E+00 | 0.00E+00 |
| 2* | 35.806 | 0.00E+00 | 5.87E-02 | -6.30E-02 | 1.06E-01 | -7.14E-02 | 1.67E-02 | 2.14E-04 | 0.00E+00 |
| 3* | 13.623 | 1.12E+02 | 3.98E-02 | -2.86E-02 | 8.59E-02 | -6.50E-02 | 1.59E-02 | 2.15E-03 | 0.00E+00 |
| 4* | 2.720 | 5.31E-01 | 6.61E-02 | -3.08E-01 | 2.10E+00 | -6.20E+00 | 1.03E+01 | -8.83E+00 | 3.18E+00 |
| 5* | 51.725 | -5.67E+04 | 3.20E-03 | 4.94E-03 | 5.44E-03 | 1.60E-04 | -4.95E-03 | 7.18E-12 | 0.00E+00 |
| 6* | 67.112 | -7.60E+04 | -1.15E-03 | 5.33E-03 | 7.77E-04 | -1.07E-02 | -5.52E-11 | -8.41E-12 | 0.00E+00 |
| 8* | 22.346 | 0.00E+00 | -2.97E-01 | 2.01E-02 | 1.07E-01 | 4.19E-02 | -4.11E-01 | 5.25E-01 | -2.19E-01 |
| 9* | 3.513 | -1.16E+01 | -2.29E-01 | 1.14E-01 | -1.68E-02 | -1.46E-03 | 1.07E-02 | -5.13E-03 | 0.00E+00 |
| 10* | -5.152 | 4.83E+00 | -8.54E-03 | -2.11E-02 | -2.86E-03 | 1.64E-03 | 7.09E-04 | -1.64E-04 | 0.00E+00 |
| 11* | 7.129 | -4.41E+01 | -1.99E-02 | -5.58E-03 | -1.48E-03 | 4.10E-04 | 4.42E-05 | -1.90E-05 | 0.00E+00 |
| 12* | 9.218 | -7.21E+01 | -7.59E-02 | 6.26E-02 | -2.85E-02 | 7.54E-03 | -1.15E-03 | 9.52E-05 | -3.37E-06 |
| 13* | 130.445 | -1.29E+26 | -1.36E-01 | 7.70E-02 | -2.35E-02 | 3.92E-03 | -3.25E-04 | 1.02E-05 | 0.00E+00 |

Figure 14:
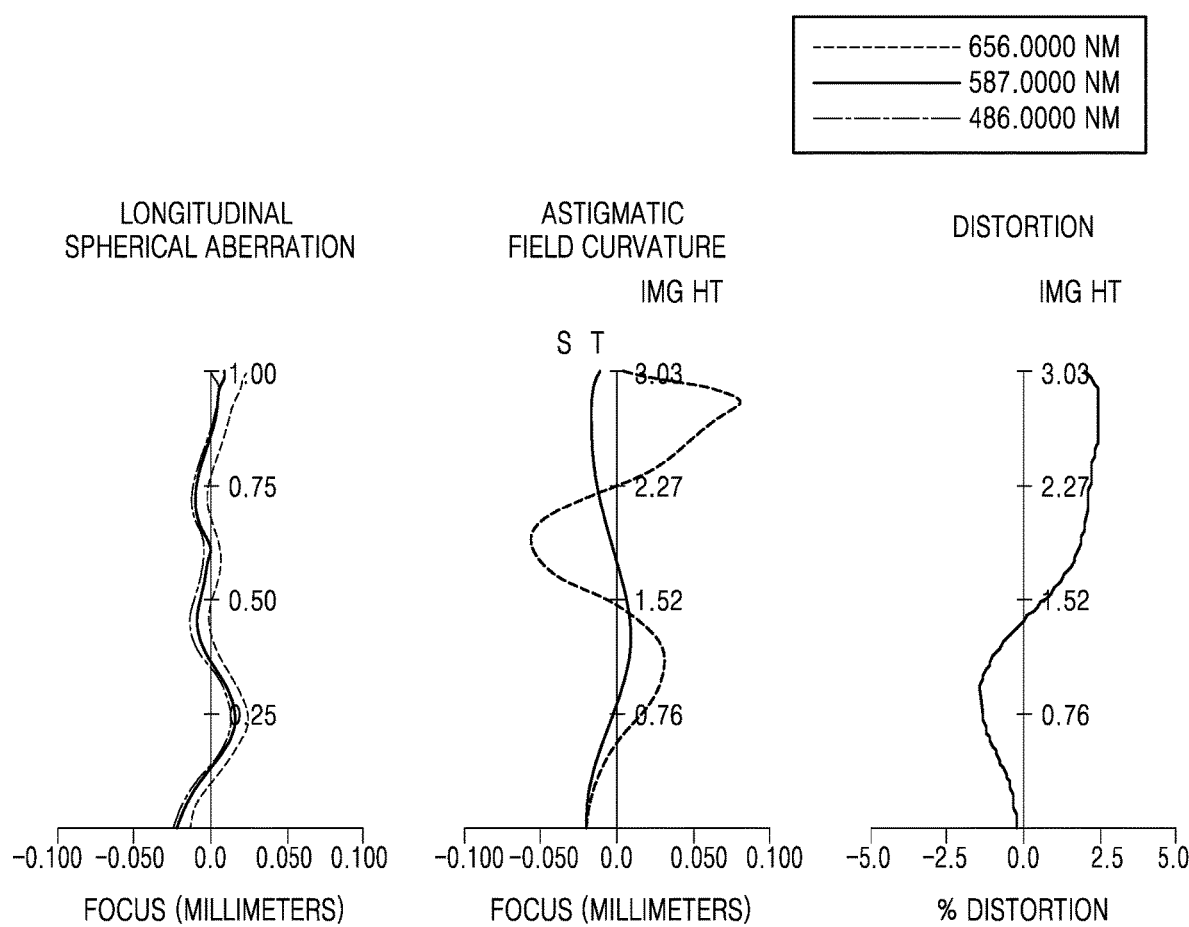
FIG. 14 is an aberration diagram of the optical lens assembly of the seventh numerical example, according to one or more embodiments.

FIG. 14 shows a longitudinal spherical aberration, an astigmatic field curvatures, and a distortion of the optical lens assembly according to the seventh numerical example of the present disclosure.

Eighth Numerical Example

FIG. 15 shows an optical lens assembly of an eighth numerical example, according to various embodiments, and Table 15 shows design data of the eighth numerical example.
EFL=6.71 mm: F-number=2.8: FOV=46 degrees

TABLE 15

| lens surface | R (mm) | Dn (mm) | Nd | Vd | Effective diameter (mm) |
|---|---|---|---|---|---|
| 1* (ST) | 1.433 | 0.814 | 1.534 | 55.7 | 2.4 |
| 2* | 37.712 | 0.030 | | | 2.9 |

TABLE 15-continued

| lens surface | R (mm) | Dn (mm) | Nd | Vd | Effective diameter (mm) |
|---|---|---|---|---|---|
| 3* | 13.828 | 0.190 | 1.658 | 21.5 | 2.2 |
| 4* | 2.735 | 0.344 | | | 1.8 |
| 5* | 38.298 | 0.235 | 1.534 | 55.7 | 1.8 |
| 6* | 64.495 | 0.939 | | | 1.7 |
| 7* | 12.951 | 0.190 | 1.554 | 50.1 | 2.0 |
| 8* | 3.068 | 1.254 | | | 2.4 |
| 9* | -5.204 | 0.190 | 1.547 | 56.1 | 3.7 |
| 10* | 10.468 | 0.063 | | | 4.1 |
| 11* | 16.421 | 0.772 | 1.658 | 21.5 | 5.1 |
| 12* | -284.204 | 0.030 | | | 5.3 |
| 13* | infinity | 0.110 | 1.517 | 64.2 | 5.8 |
| 14 | infinity | 0.470 | | | 5.8 |
| IMG | | 0.020 | | | 6.2 |

Table 16 illustrates aspherical coefficients in the eighth numerical example.

TABLE 16

| lens surface | R | K | A | B | C | D |
|---|---|---|---|---|---|---|
| 1* | 1.433 | -3.22E-02 | 3.90E-03 | -1.03E-04 | 1.01E-02 | -8.75E-03 |
| 2* | 37.712 | 0.00E+00 | 4.78E-02 | 1.73E-02 | -1.09E-01 | 1.97E-01 |
| 3* | 13.828 | 1.12E+02 | 3.26E-02 | 3.73E-02 | -1.32E-01 | 2.65E-01 |
| 4* | 2.735 | 6.97E-01 | 4.40E-02 | -3.62E-02 | 5.18E-01 | -1.57E+00 |
| 5* | 38.298 | -4.76E+04 | 4.55E-02 | -2.78E-01 | 9.32E-01 | -1.64E+00 |
| 6* | 64.495 | -4.17E+04 | -4.14E-03 | -4.40E-02 | 1.59E-01 | -2.56E-01 |
| 7* | 12.951 | 0.00E+00 | -3.45E-01 | 5.27E-02 | 4.54E-01 | -1.32E+00 |
| 8* | 3.068 | -1.48E+01 | -2.49E-01 | 2.18E-01 | -2.11E-01 | 1.91E-01 |
| 9* | -5.204 | 4.75E+00 | -1.59E-02 | 9.66E-03 | -3.90E-02 | 2.15E-02 |
| 10* | 10.468 | -4.60E+01 | 9.82E-03 | -4.32E-02 | 2.34E-02 | -8.61E-03 |
| 11* | 16.421 | -5.06E+01 | -7.15E-02 | 5.45E-02 | -2.25E-02 | 5.46E-03 |
| 12* | -284.204 | 0.00E+00 | -1.90E-01 | 1.60E-01 | -8.87E-02 | 3.43E-02 |

| lens surface | E | F | G | H | J |
|---|---|---|---|---|---|
| 1* | 4.43E-03 | 0.00E+00 | 0.00E+00 | 0.00E+00 | 0.00E+00 |
| 2* | -1.45E-01 | 3.81E-02 | 0.00E+00 | 0.00E+00 | 0.00E+00 |
| 3* | -2.15E-01 | 6.29E-02 | 0.00E+00 | 0.00E+00 | 0.00E+00 |
| 4* | 3.03E+00 | -2.98E+00 | 1.24E+00 | 0.00E+00 | 0.00E+00 |
| 5* | 1.57E+00 | -6.30E-01 | 0.00E+00 | 0.00E+00 | 0.00E+00 |
| 6* | 2.46E-01 | -1.30E-01 | 0.00E+00 | 0.00E+00 | 0.00E+00 |
| 7* | 1.25E+00 | 9.20E-01 | -2.95E+00 | 2.34E+00 | -6.52E-01 |
| 8* | -8.53E-02 | 1.38E-02 | 0.00E+00 | 0.00E+00 | 0.00E+00 |
| 9* | -4.30E-03 | 3.02E-04 | 0.00E+00 | 0.00E+00 | 0.00E+00 |
| 10* | 1.74E-03 | -1.47E-04 | 0.00E+00 | 0.00E+00 | 0.00E+00 |
| 11* | -7.76E-04 | 6.11E-05 | -2.11E-06 | 0.00E+00 | 0.00E+00 |
| 12* | -8.96E-03 | 1.53E-03 | -1.62E-04 | 9.63E-06 | -2.44E-07 |

Figure 16:
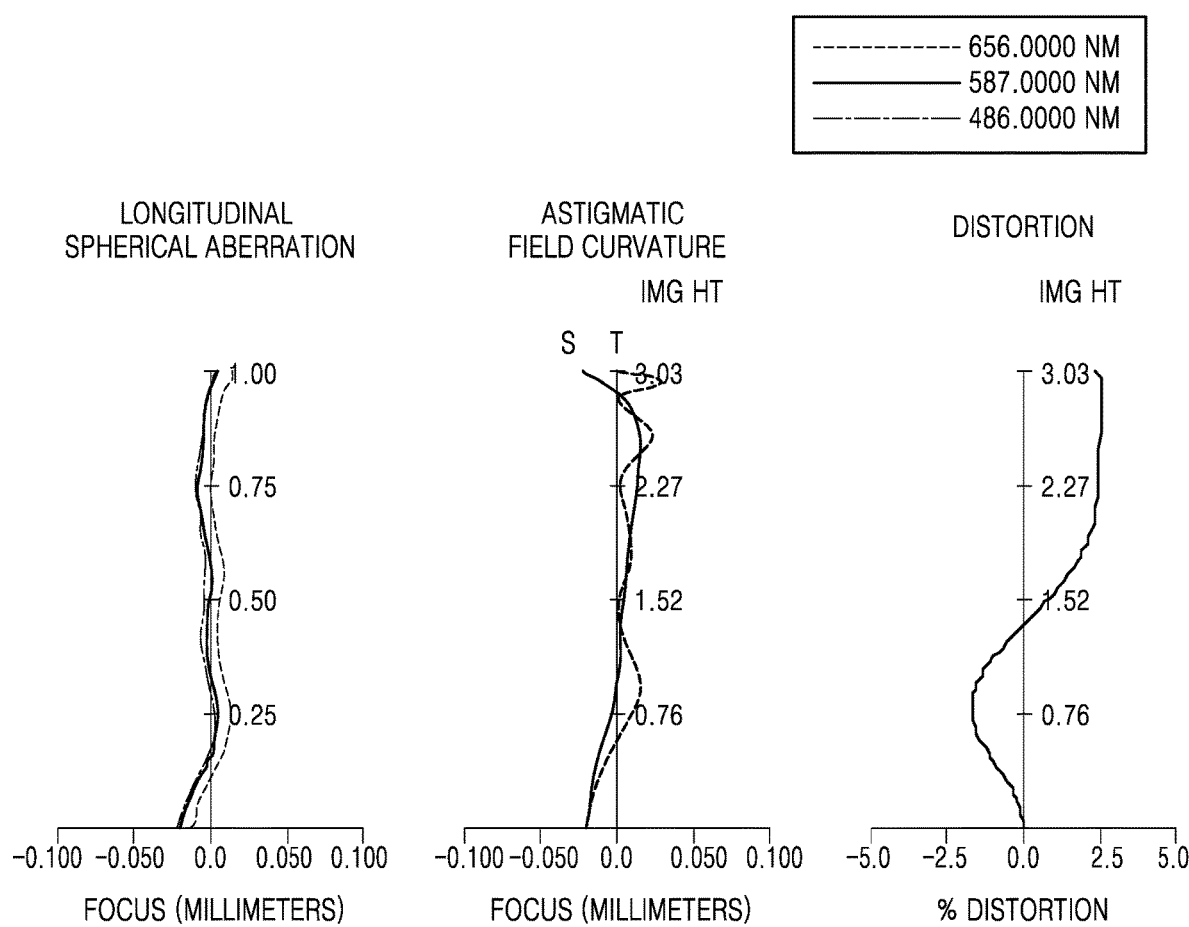
FIG. 16 is an aberration diagram of the optical lens assembly of the eighth numerical example, according to one or more embodiments.

FIG. 16 shows a longitudinal spherical aberration, an astigmatic field curvatures, and a distortion of the optical lens assembly according to the eighth numerical example of the present disclosure.

Ninth Numerical Example

FIG. 17 shows an optical lens assembly of a ninth numerical example, according to various embodiments, and Table 17 shows design data of the ninth numerical example, for example.

EFL=6.71 mm; F-number=2.8; FOV=46 degrees

TABLE 17

| lens surface | R (mm) | Dn (mm) | Nd | Vd | Effective diameter (mm) |
|---|---|---|---|---|---|
| 1* | 1.451 | 0.814 | 1.547 | 56.1 | 2.4 |
| 2* | 27.926 | 0.040 | | | 2.1 |
| 3* (ST) | 13.680 | 0.200 | 1.658 | 21.5 | 2.1 |
| 4* | 2.845 | 0.900 | | | 1.8 |
| 5* | 49.635 | 0.200 | 1.547 | 56.1 | 1.7 |
| 6* | 21.092 | 0.292 | | | 1.8 |
| 7* | 72.529 | 0.200 | 1.547 | 56.1 | 1.9 |
| 8* | 4.488 | 0.802 | | | 2.3 |
| 9* | −4.922 | 0.200 | 1.547 | 56.1 | 3.4 |
| 10* | −5.156 | 0.439 | | | 3.6 |
| 11* | −3.902 | 0.300 | 1.547 | 56.1 | 3.9 |
| 12* | 1070.618 | 0.030 | | | 4.3 |
| 13* | 58.423 | 0.653 | 1.658 | 21.5 | 5.1 |
| 14* | −47.614 | 0.030 | | | 5.3 |
| 15 | infinity | 0.110 | 1.517 | 64.2 | 5.6 |
| 16 | infinity | 0.470 | | | 5.7 |
| IMG | | 0.020 | | | 6.1 |

Table 18 illustrates aspherical coefficients in the ninth numerical example.

TABLE 18

| lens surface | R | K | A | B | C | D | E | F | G |
|---|---|---|---|---|---|---|---|---|---|
| 1* | 1.451 | −1.08E−02 | 4.01E−03 | −1.95E−03 | 1.53E−02 | −1.39E−02 | 6.89E−03 | 0.00E+00 | 0.00E+00 |
| 2* | 27.926 | 0.00E+00 | 6.12E−02 | −6.25E−02 | 1.03E−01 | −7.24E−02 | 1.75E−02 | 4.68E−04 | 0.00E+00 |
| 3* | 13.680 | 5.95E+01 | 3.66E−02 | −3.39E−02 | 1.03E−01 | −9.71E−02 | 3.80E−02 | −1.89E−03 | 0.00E+00 |
| 4* | 2.845 | −2.52E−01 | 3.36E−02 | −1.73E−02 | 4.63E−01 | −1.50E+00 | 2.85E+00 | −2.81E+00 | 1.19E+00 |
| 5* | 49.635 | 0.00E+00 | 0.00E+00 | 0.00E+00 | 0.00E+00 | 0.00E+00 | 0.00E+00 | 0.00E+00 | 0.00E+00 |
| 6* | 21.092 | 0.00E+00 | 0.00E+00 | 0.00E+00 | 0.00E+00 | 0.00E+00 | 0.00E+00 | 0.00E+00 | 0.00E+00 |
| 7* | 72.529 | −1.27E+05 | −2.35E−01 | −2.43E−01 | 1.84E+00 | −4.95E+00 | 6.79E+00 | −4.62E+00 | 1.23E+00 |
| 8* | 4.488 | −6.59E+00 | −2.48E−01 | 3.54E−01 | −4.97E−01 | 4.83E−01 | −2.28E−01 | 3.98E−02 | 0.00E+00 |
| 9* | −4.922 | 5.38E+00 | −1.94E−03 | 7.66E−05 | 4.23E−05 | 1.47E−05 | 4.91E−06 | 1.74E−06 | 0.00E+00 |
| 10* | −5.156 | 6.78E+00 | 6.78E−03 | 8.09E−04 | −6.98E−05 | −8.51E−05 | −8.57E−06 | −1.35E−05 | 0.00E+00 |
| 11* | −3.902 | −1.02E+01 | −3.10E−02 | −2.03E−03 | −1.36E−07 | 1.23E−05 | 8.09E−06 | 2.23E−06 | 0.00E+00 |
| 12* | 1070.618 | −4.72E+03 | −1.62E−02 | −5.46E−04 | −1.58E−05 | 1.83E−04 | 7.26E−06 | −4.43E−06 | 0.00E+00 |
| 13* | 58.423 | 4.92E+02 | −7.54E−02 | 6.25E−02 | −2.85E−02 | 7.54E−03 | −1.15E−03 | 9.51E−05 | −3.38E−06 |
| 14* | −47.614 | −1.29E+26 | −1.36E−01 | 7.68E−02 | −2.34E−02 | 3.93E−03 | −3.25E−04 | 1.01E−05 | 0.00E+00 |

Figure 18:
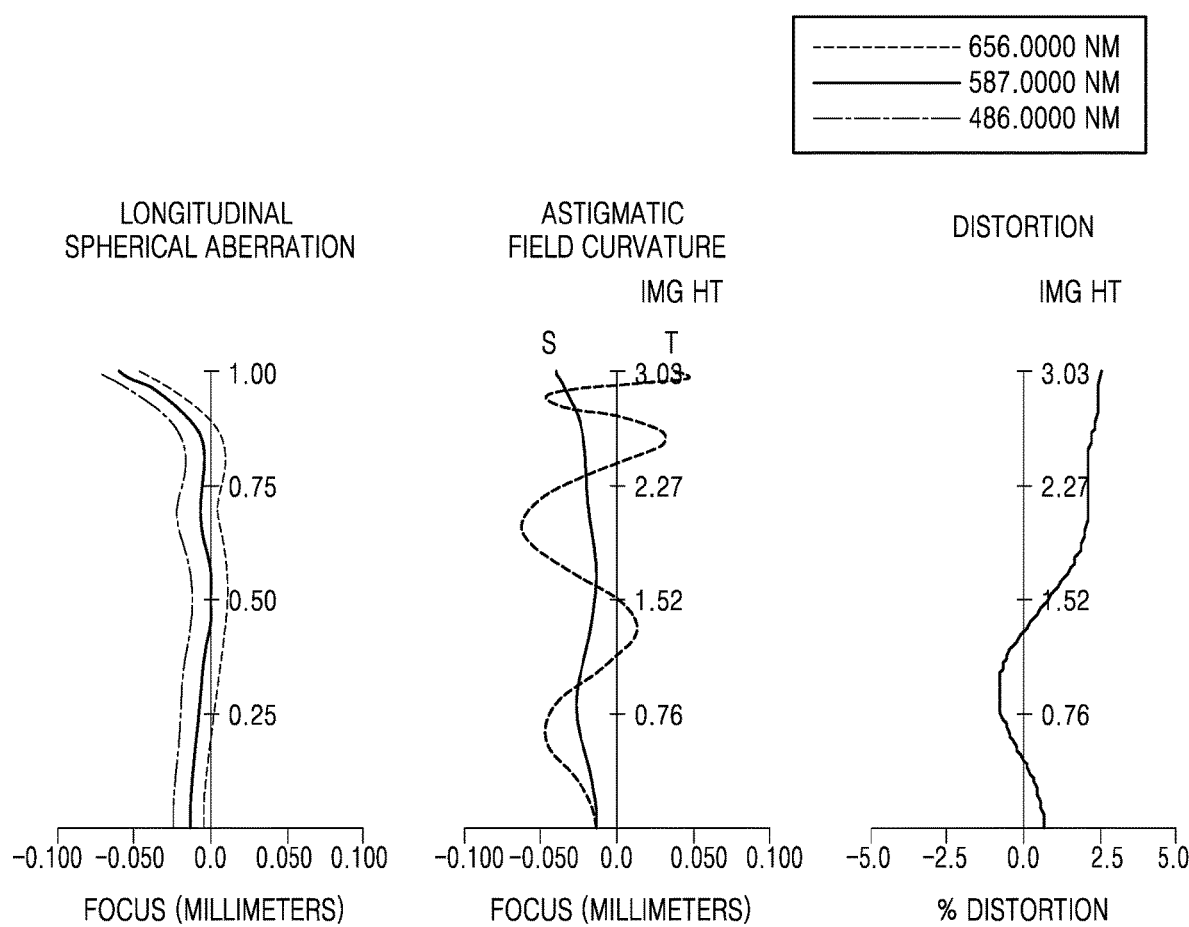
FIG. 18 is an aberration diagram of the optical lens assembly of the ninth numerical example, according to one or more embodiments.

FIG. 18 shows a longitudinal spherical aberration, an astigmatic field curvatures, and a distortion of the optical lens assembly according to the ninth numerical example of the present disclosure.

Table 19 illustrates that the optical lens assembly according to the first to ninth numerical examples satisfies the above conditions 1 to 12.

TABLE 19

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| YL/YM | 0.12 | 0 | 0 | 0 | 0 | 0 | 0 | 0 | 0 |
| FOV | 46 | 56 | 46 | 54 | 46 | 55 | 46 | 46 | 46 |

TABLE 19-continued

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| F1/EFL | 0.76 | 0.76 | 0.64 | 0.78 | 0.66 | 0.81 | 0.68 | 0.68 | 0.65 |
| F11/EFL | 0.43 | 0.48 | 0.40 | 0.50 | 0.41 | 0.49 | 0.41 | 0.41 | 0.41 |
| Vd12 | 21.52 | 21.52 | 21.52 | 21.52 | 21.52 | 21.52 | 21.52 | 21.52 | 21.52 |
| F2/EFL | 0.00 | 0.00 | −1.05 | −2.08 | −1.14 | −6.74 | −1.16 | −1.15 | −1.13 |
| F3/EFL | −0.64 | −0.99 | −1.20 | −2.47 | −1.50 | −1.59 | −1.28 | −1.30 | −1.30 |
| F31/EFL | −0.48 | −0.81 | −0.62 | −1.44 | −1.00 | −0.81 | −0.81 | −0.94 | −1.06 |
| F32/EFL | 1.93 | 5.20 | 1.33 | 3.48 | 3.06 | 1.74 | 2.24 | 3.52 | 5.95 |

The optical lens assembly according to example embodiments may be applied to a photographing device adopting an image sensor. The optical lens to assembly according to an example embodiment may be applied to various photographing devices such as a digital camera, a lens replaceable camera, a video camera, a cellphone camera, a camera for small-sized mobile devices, etc.

Figure 20:
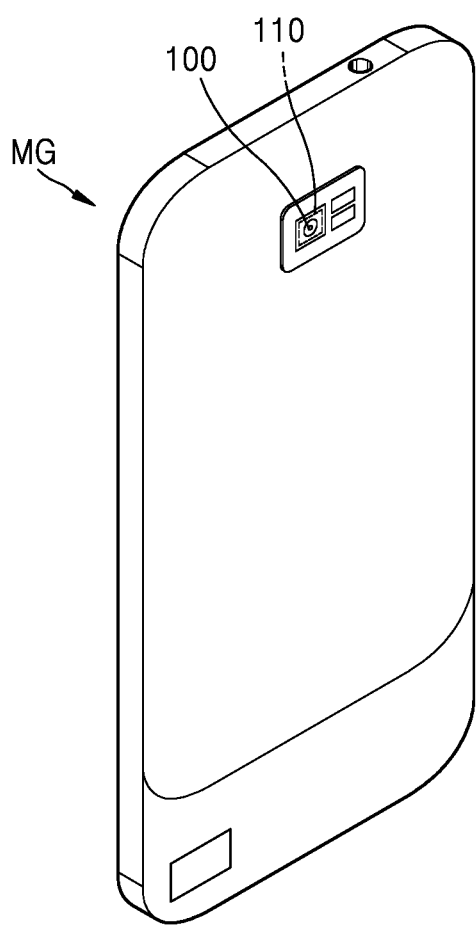
FIG. 20 is a diagram of an electronic device including an optical lens assembly according to various embodiments.

FIG. 20 is a diagram showing an example of an electronic device MG including an optical lens assembly according to an example embodiment. FIG. 20 shows an example, in which the electronic device MG is a mobile phone, but various embodiments are not limited thereto. The electronic device MG may include an optical lens assembly 100, and an image sensor 110 receiving an image captured by the optical lens assembly 100 and converting the image into an electric image signal. The optical lens assembly 100 may be one of the optical lens assemblies described above with reference to FIGS. 1 to 18. When the optical lens assembly according to the embodiments is applied to a photographing device such as small-sized digital camera, a mobile phone, etc., a photographing device capable of telephoto-photographing with high performance may be implemented.

Figure 21:
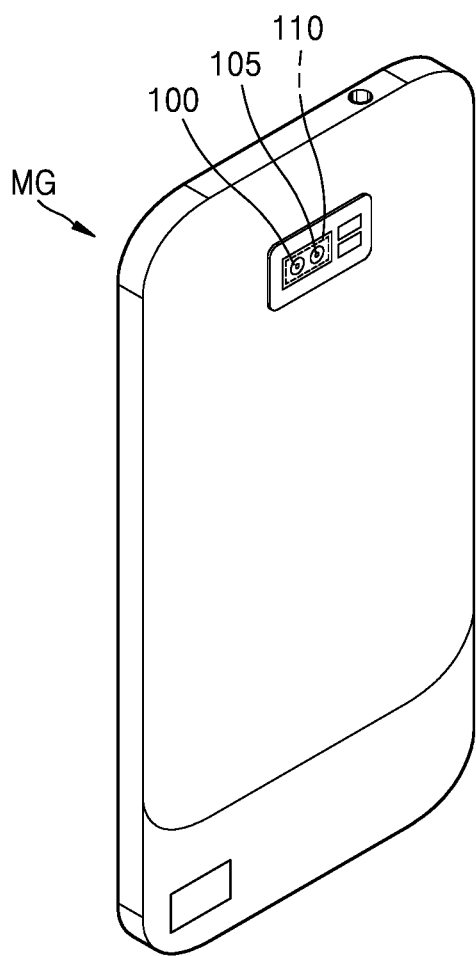
FIG. 21 is a diagram of an electronic device including an optical lens assembly according to various embodiments.

The electronic device MG shown in FIG. 21 may include the optical lens assembly 100, another optical lens assembly 105, and an image sensor 110. For example, the optical lens assembly 100 and the optical lens assembly 105 may have different viewing angles or different focal lengths from each other. For example, the optical lens assembly 100 may be a telephoto lens system, and the optical lens assembly 105 may be a standard lens system. Otherwise, the optical lens assembly 100 may be a telephoto lens system, and the optical lens assembly 105 may be a wide angle lens system. For example, the telephoto lens system may have a viewing angle of 60 or less. As described above, the photographing device MG may include a plurality of optical lens assemblies, and may capture images by selectively using the plurality of optical lens assemblies.

FIGS. 22A to 22D are flowcharts (2200, 2220, 2240, and 2260) of higher-level of a method of capturing images by using the optical lens assembly 100 illustrated with reference to FIGS. 1 to 18, in an electronic device according to various embodiments.

Figure 22A:
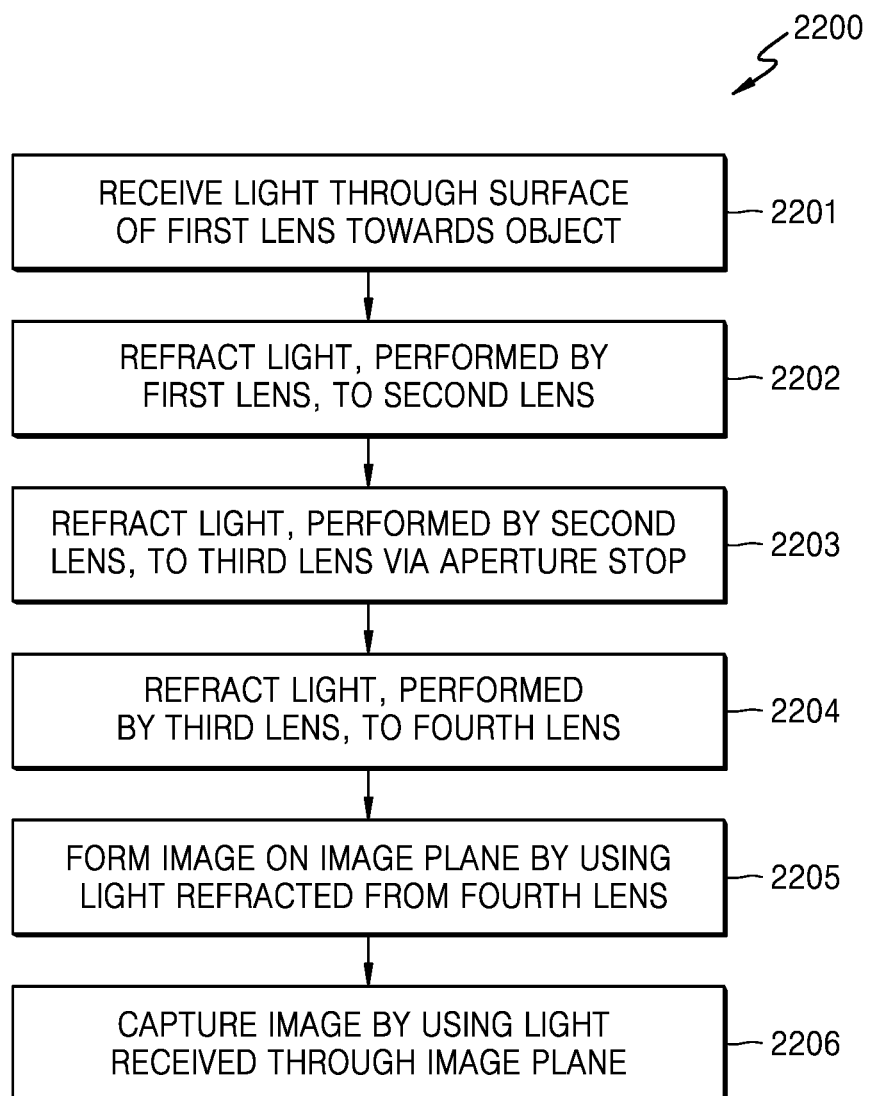

FIG. 22A is a high-level flowchart (2200) of a method of capturing images by using optical lens assemblies 100-1 and 100-2 illustrated in FIGS. 1 and 3, in the electronic device according to various embodiments. According to an embodiment, in operation 2201, the optical lens assembly 100-1 or 100-2 may receive light through a surface towards the object in a first lens L1-1 or L1-2 included in the optical lens assembly.

In operation 2202, for example, the first lens L1-1 or L1-2 included in the optical lens assembly may refract the light to the second lens L2-1 or L2-2.

In operation 2203, for example, the second lens L2-1 or L2-2 included in the optical lens assembly may refract the light to the third lens L3-1 or L3-2 via the aperture stop ST. According to various embodiments, the aperture stop ST may be arranged at an image side I of the second lens L2-1 or L2-2 shown in FIG. 1 or FIG. 3.

In operation 2204, for example, the third lens L3-1 or L3-2 included in the optical lens assembly may refract the light to the fourth lens L4-1 or L4-2.

In operation 2205, for example, the light refracted from the fourth lens L4-1 or L4-2 may form an image on an image plane IMG. According to various embodiments, the light may form the image on the image plane IMG via the optical device OD. The optical device OD may include at least one of, for example, a low pass filter, an infrared (IR)-cut filter, and a cover glass.

Figure 22B:
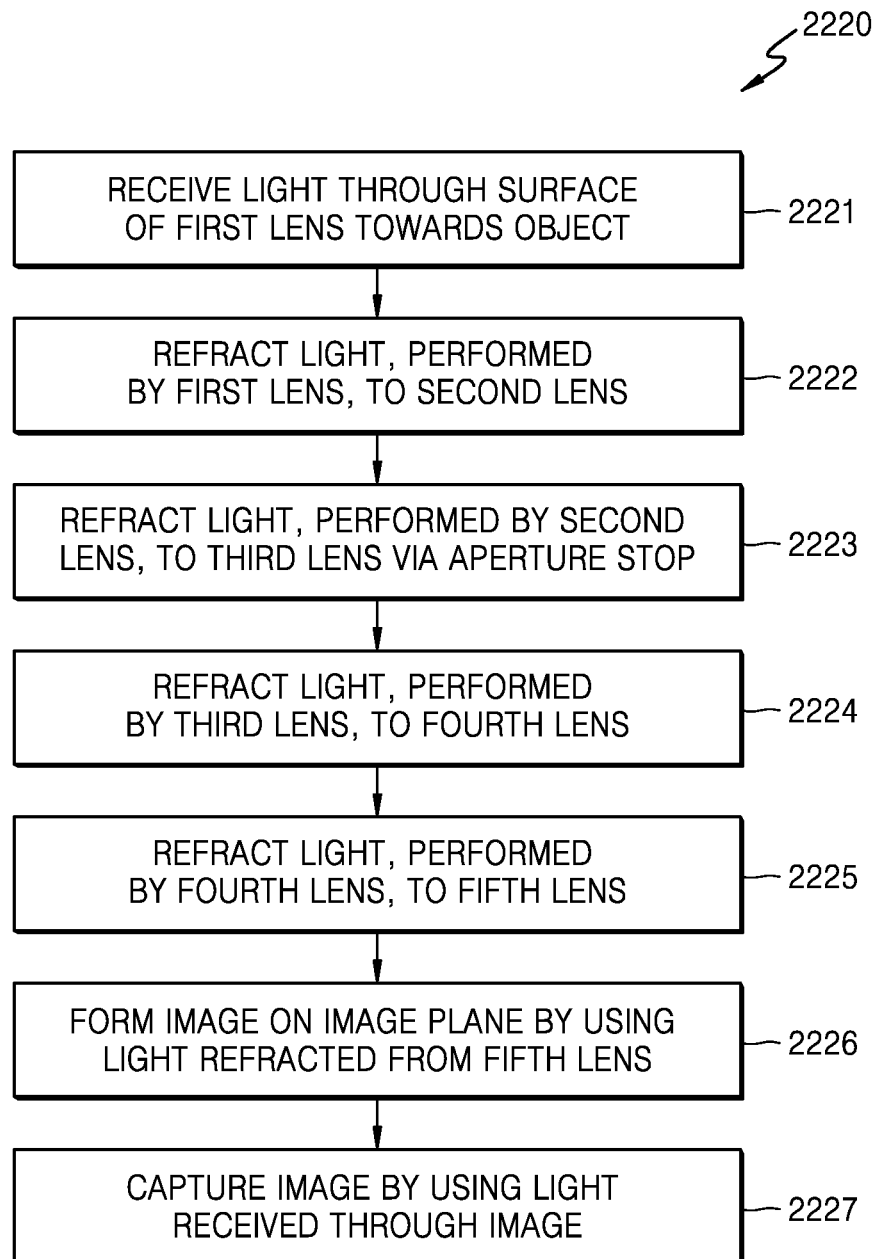

In operation 2206, for example, an electronic device including the optical lens assembly (e.g., an electronic device 230 of FIG. 23, or an electronic device 301 of FIG. 24) may capture the image by using the light transmitted through the image plane IMG. For example, the image may be captured by using an image sensor (not shown) configuring at least a part of a camera module (e.g., a camera module 225 of FIG. 23 or a camera module 391 of FIG. 24) included in the electronic device. FIG. 22B is a high-level flowchart (2220) of a method of capturing images by using optical lens assemblies 100-3 and 100-4 illustrated in FIGS. 5 and 7, in the electronic device according to various embodiments.

According to an embodiment, in operation 2221, the optical lens assembly 100-3 or 100-4, for example, may receive light through a surface towards the object in the first lens L1-1 or L1-2 included in the optical lens assembly.

In operation 2222, for example, the first lens L1-3 or L1-4 included in the optical lens assembly may refract the light to the second lens L2-3 or L2-4.

In operation 2223, for example, the second lens L2-3 or L2-4 included in the optical lens assembly may refract the light to the third lens L3-3 or L3-4 via the aperture stop ST. According to various embodiments, the aperture stop ST may be arranged at an image side I of the second lens L2-3 or L2-4 shown in FIG. 5 or FIG. 7.

In operation 2224, for example, the third lens L3-3 or L3-4 included in the optical lens assembly may refract the light to the fourth lens L4-3 or L4-4.

In operation 2225, for example, the fourth lens L4-3 or L4-4 included in the optical lens assembly may refract the light to the fifth lens L5-3 or L5-4.

In operation 2226, for example, the light refracted from the fifth lens L5-3 or L5-4 may form an image on an image plane IMG. According to various embodiments, the light may form the image on the image plane IMG via the optical device OD. The optical device OD may include at least one of, for example, a low pass filter, an infrared (IR)-cut filter, and a cover glass.

In operation 2227, for example, an electronic device including the optical lens assembly (e.g., an electronic device 230 of FIG. 23, or an electronic device 301 of FIG. 24) may capture the image by using the light transmitted through the image plane IMG. For example, the image may be captured by using an image sensor (not shown) configuring at least a part of a camera module (e.g., a camera module 225 of FIG. 23 or a camera module 391 of FIG. 24) included in the electronic device.

FIG. 22C is a flowchart (2240) of higher-level of a method of capturing images by using an optical lens assembly 100-5, 100-6, 100-7, and 100-8 illustrated with reference to FIGS. 9, 11, 13, and 15, in an electronic device according to various example embodiments.

According to an embodiment, in operation 2241, the optical lens assembly 100-5, 100-6, 100-7, or 100-8, for example, may receive light through a surface towards the object in the first lens L1-5, L1-6, L1-7, or L1-8 included in the optical lens assembly.

In operation 2242, for example, the first lens L1-5, L1-6, L1-7, or L1-8 included in the optical lens assembly may refract the light towards the second lens L2-5, L2-6, L2-7, or L2-8.

In operation 2243, for example, the second lens L2-5, L2-6, L2-7, or L2-8 included in the optical lens assembly may refract the light towards the third lens L3-5, L3-5, L3-6, or L3-7. According to various embodiments, the aperture stop ST may be arranged at the image side I of the second lens L2-5 or L2-6 in FIG. 9 or 11, may be arranged at the object side O of the first lens L1-7 of FIG. 12, or may be arranged at the image side I of the first lens L1-8 of FIG. 13.

In operation 2244, for example, the third lens L3-5, L3-6, L3-7, or L3-8 included in the optical lens assembly may refract the light towards the fourth lens L4-5, L4-6, L4-7, or L4-8.

In operation 2245, for example, the fourth lens L4-5, L4-6, L4-7, or L4-8 included in the optical lens assembly may refract the light towards the fifth lens L5-5, L5-6, L5-7, or L5-8.

In operation 2246, for example, the fifth lens L5-5, L5-6, L5-7, or L5-8 included in the optical lens assembly may refract the light towards the sixth lens L6-5, L6-6, L6-7, or L6-8.

In operation 2247, for example, the light refracted from the sixth lens L6-5, L6-6, L6-7, or L6-8 may form an image on an image plane IMG. According to various embodiments, the light may form the image on the image plane IMG via the optical device OD. The optical device OD may include at least one of, for example, a low pass filter, an infrared (IR)-cut filter, and a cover glass.

In operation 2248, for example, an electronic device including the optical lens assembly (e.g., an electronic device 230 of FIG. 23, or an electronic device 301 of FIG. 24) may capture the image by using the light transmitted through the image plane IMG. For example, the image may be captured by using an image sensor (not shown) configuring at least a part of a camera module (e.g., a camera module 225 of FIG. 23 or a camera module 391 of FIG. 24) included in the electronic device. FIG. 22D is a high-level flowchart (2260) of a method of performing an image capturing by using the optical lens assembly 100-9 illustrated in FIG. 17, in the electronic device according to various embodiments.

According to an embodiment, in operation 2261, the optical lens assembly 100-9, for example, may receive light through a surface towards the object in the first lens L1-9 included in the optical lens assembly.

In operation 2262, for example, the first lens L1-9 included in the optical lens assembly may refract the light towards the second lens L2-9.

In operation 2263, for example, the second lens L2-9 included in the optical lens assembly may refract the light towards the third lens L3-9. According to various embodiments, the aperture stop ST may be arranged at the object side O of the second lens L2-9 of FIG. 17.

In operation 2264, for example, the third lens L3-9 included in the optical lens assembly may refract the light towards the fourth lens L4-9.

In operation 2265, for example, the fourth lens L4-9 included in the optical lens assembly may refract the light towards the fifth lens L5-9.

In operation 2266, for example, the fifth lens L5-9 included in the optical lens assembly may refract the light towards the sixth lens L6-9.

In operation 2267, for example, the sixth lens L6-9 included in the optical lens assembly may refract the light towards the seventh lens L7-9.

In operation 2268, for example, the light refracted from the seventh lens L7-9 may form an image on an image plane IMG. According to various embodiments, the light may form the image on the image plane IMG via the optical device OD. The optical device OD may include at least one of, for example, a low pass filter, an infrared (IR)-cut filter, and a cover glass.

In operation 2269, for example, an electronic device including the optical lens assembly (e.g., an electronic device 230 of FIG. 23, or an electronic device 301 of FIG. 24) may capture the image by using the light transmitted through the image plane IMG. For example, the image may be captured by using an image sensor (not shown) configuring at least a part of a camera module (e.g., a camera module 225 of FIG. 23 or a camera module 391 of FIG. 24) included in the electronic device.

The optical lens assembly according to various embodiments includes, sequentially from an object side to an image side, a first lens having a positive refractive power and having a concave surface towards the image side, a second lens having a negative refractive power, a third lens having a negative refractive power, and a fourth lens having a positive refractive power and adjacent to the image side, and the optical lens assembly satisfies following condition:

$$0 \leq YL/YM < 0.4$$

$$28 < FOV < 60 \text{ (Degrees)}, \quad \text{<Condition>}$$

where YL denotes a distance from an optical axis to a maximum sag in an image side surface of the fourth lens, YM denotes ½ of an effective diameter of the image side surface of the fourth lens, and FOV denotes a viewing angle.

For example, the first lens and the second lens configure a front group, and the third lens and the fourth lens configure a rear group.

For example, at least one of the third lens and the fourth lens has at least one aspherical surface, and the at least one aspherical surface may have at least one inflection point.

The optical lens assembly according to various embodiments further includes an intermediate group including one or more of a fifth lens, a sixth lens, and a seventh lens, and the intermediate group is located between the first lens group and the second lens group) and has a negative refractive power.

For example, an aperture stop may be further provided between the front group and the rear group.

For example, at least one aperture stop may be provided between the object side and the rear group.

The optical lens assembly according to various embodiments satisfies following condition:

$$0 < F1/EFL < 10, \quad \text{<Condition>}$$

where F1 denotes a focal length of the first group, and EFL denotes a focal length of the optical lens assembly.

The optical lens assembly according to various embodiments satisfies following condition:

$$0 < F11/EFL < 1, \quad \text{<Condition>}$$

where F11 denotes a focal length of the first lens, and EFL denotes a focal length of the optical lens assembly.

The optical lens assembly according to various embodiments satisfies following condition:

$$20 < Vd12 < 30, \quad \text{<Condition>}$$

where Vd12 denotes an Abbe's number of the second lens.

For example, an intermediate group having a negative refractive power may be further provided between the front group and the rear group, and the intermediate group includes one or two lenses and satisfies following condition:

$$-100 < F2/EFL < 0, \quad \text{<Condition>}$$

where F2 denotes a focal length of the intermediate group, and EFL denotes a focal length of the optical lens assembly.

The optical lens assembly according to various embodiments satisfies following condition:

$$-100 < F3/EFL < 0, \quad \text{<Condition>}$$

where F3 denotes a focal length of the rear group, and EFL denotes a focal length of the optical lens assembly.

The optical lens assembly according to various embodiments satisfies following condition:

$$-100 < F31/EFL < 0, \quad \text{<Condition>}$$

where F31 denotes a focal length of the third lens, and EFL denotes a focal length of the optical lens assembly.

The optical lens assembly according to various embodiments satisfies following condition:

$$0.5 < F32/EFL < 100, \quad \text{<Condition>}$$

where F32 denotes a focal length of the fourth lens, and EFL denotes a focal length of the optical lens assembly.

For example, the first to fourth lenses may include at least one aspherical lens.

For example, each of the first to fourth lenses may be a plastic lens.

For example, the intermediate group may include a fifth lens having a negative refractive power, and a sixth lens having a negative refractive power.

The optical lens assembly according to various embodiments includes, sequentially from an object side to an image side, a first lens having a positive refractive power and having a concave surface towards the image side, a second lens having a negative refractive power, a third lens having a negative refractive power, and a fourth lens having a positive refractive power and adjacent to the image side, and the optical lens assembly has a viewing angle greater than 35 and less than 49.

The optical lens assembly according to various embodiments includes, sequentially from an object side to an image side, a first lens having a positive refractive power and having a concave surface towards the image side, a second lens having a negative refractive power, a third lens having a negative refractive power, and a fourth lens having a positive refractive power and having a surface that is convex towards the object, and adjacent to the image side, and the optical lens assembly satisfies following condition:

$0 \leq YL/YM < 0.4$ $0 < FOV < 60$ (Degrees). <Condition> where YL denotes a distance from an optical axis to a maximum sag in an image side surface of the fourth lens, YM denotes ½ of an effective diameter of the image side surface of the fourth lens, and FOV denotes a viewing angle.

The optical lens assembly according to various embodiments includes, sequentially from an object side to an image side, a first lens having a positive refractive power and having a concave surface towards the image side, a second lens having a negative refractive power, a third lens having a negative refractive power, and a fourth lens having a positive refractive power and having a surface that is convex towards the object, and adjacent to the image side, and the optical lens assembly has a viewing angle less than 49.

The optical lens assembly according to various embodiments further includes a third group including one or more of a fifth lens, a sixth lens, and a seventh lens, and the third group is located between the first lens group and the second lens group and has a negative refractive power.

The electronic device according to various embodiments includes an optical lens assembly; and an image sensor receiving light focused by the optical lens assembly, and the optical lens assembly includes, sequentially from the object side to the image side, a first lens having a positive refractive power and a surface concave towards the image side; a second lens having a negative refractive power; a third lens having a negative refractive power; and a fourth lens having a positive refractive power and adjacent to the image side, wherein the optical lens assembly satisfies following condition:

$0 \leq YL/YM < 0.4$ $28 < FOV < 60$ (Degrees), <Condition> where YL denotes a distance from an optical axis to a maximum sag in an image side surface of the fourth lens, YM denotes ½ of an effective diameter of the image side surface of the fourth lens, and FOV denotes a viewing angle.

The electronic device according to various embodiments further includes at least one optical lens assembly having a viewing angle that is different from that of the above optical lens assembly.

The at least one optical lens assembly may include a standard lens system or a wide-angle lens system.

The method of forming images according to various embodiments includes: an operation in which light having a viewing angle within a range of 28° to 60° is incident to a first lens having a positive refractive power and a surface concave towards an image side; an operation in which the light is refracted by the first lens and incident to a second lens having a negative refractive power; an operation in which the light is refracted by the second lens and incident to a third lens having a negative refractive power; an operation in which the light is refracted by the third lens and incident to a fourth lens having a positive refractive power and adjacent to the image side; and an operation in which an image sensor receives the light passed through the fourth lens to form an image, wherein the fourth lens satisfies a condition $0 \leq YL/YM < 0.4$ where YL denotes a distance from an optical axis to a maximum sag in an image side surface of the fourth lens, YM denotes ½ of an effective diameter of the image side surface of the fourth lens, and FOV denotes a viewing angle.

For example, an image may be formed by using light having a viewing angle within a different range from the above range.

Figure 23:
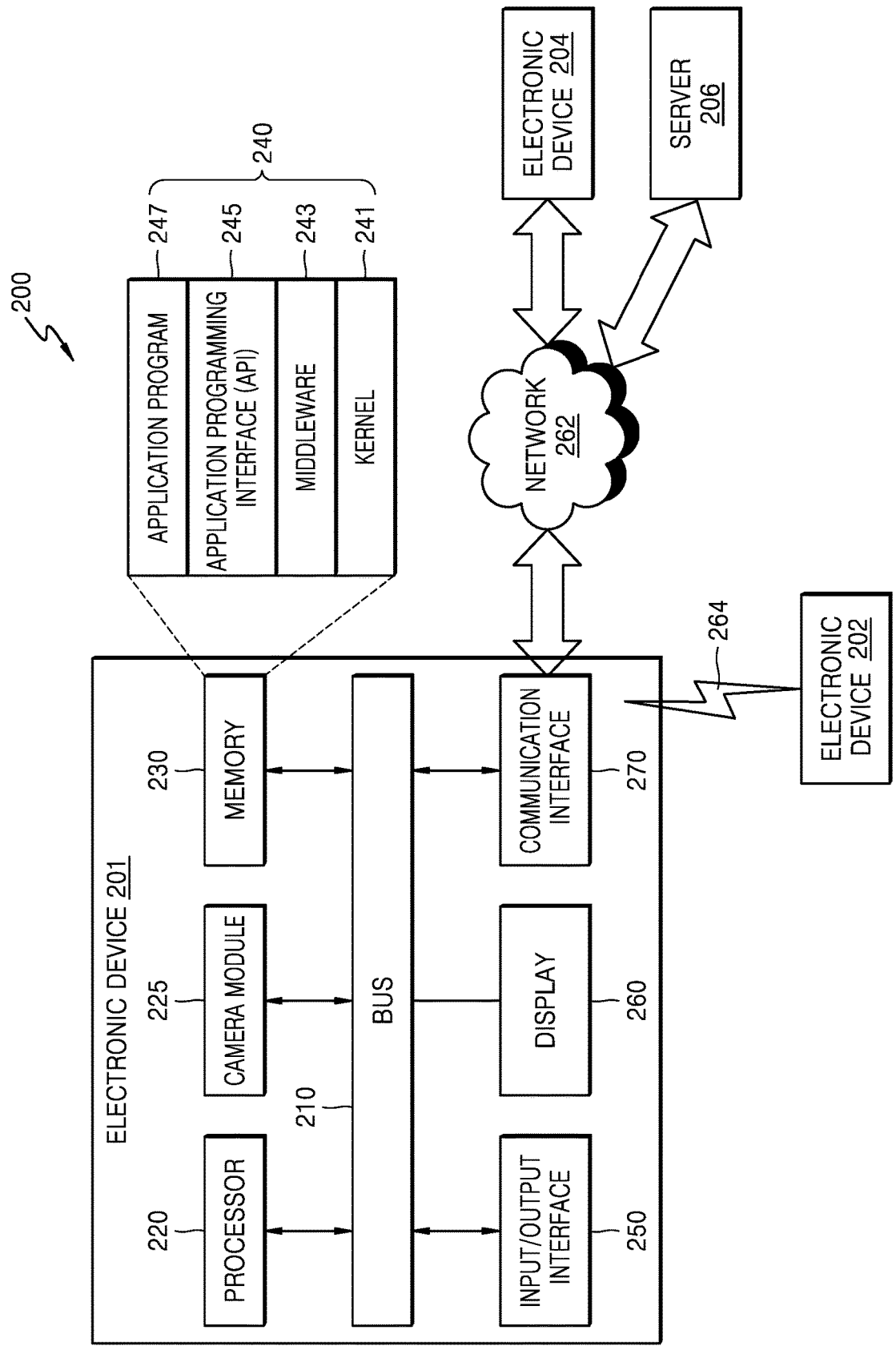
FIG. 23 is a diagram of a network environment system according to various embodiments.

An electronic device 201 in a network environment 200 according to various embodiments will be described below with reference to FIG. 23. The electronic device 201 may include a bus 110, a processor 220, a camera module 225, a memory 230, an input/output interface 250, a display 260, and a communication interface 270. In some embodiments, the electronic device 201 may omit at least one of the components, or may further include an additional component.

The bus 210 may include, for example, a circuit connecting the components (210 to 270) to one another and transmitting communication (e.g., a control message and/or data) among the components.

The processor 220 may include at least one of a central processing unit (CPU), an application processor (AP), and a communication processor (CP). The processor 220 may execute, for example, calculations or data processing about controlling and/or communicating among at least one another component in the electronic device 201.

The camera module 225 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various embodiments may be applied to the camera module 225.

The memory 230 may include a volatile and/or non-volatile memory. The memory 230 may store, for example, commands or data regarding at least one another component in the electronic device 201. According to one example embodiment, the memory 230 may store software and/or a program 240. The program 240 may include, for example, a kernel 241, middleware 243, an application programming interface (API) 245, and/or an application program (or "application") 247, etc. At least some of the kernel 241, the middleware 243, or the API 245 may be referred to as an operating system (OS).

The kernel 241 may control or manage system resources (e.g., the bus 210, the processor 220, the memory 230, etc.) used to execute operations or functions implemented in other programs (e.g., the middleware 243, the API 245, or the application program 247). Also, the kernel 241 may provide an interface capable of controlling or managing the system resources, by accessing individual component of the electronic device 201 from the middleware 243, the API 245, or the application program 247.

The middleware 243 may perform mediation function so that, for example, the API 245 or the application program 247 may communicate with the kernel 241 and exchange data.

In addition, the middleware 243 may process one or more operation requests transmitted from the application program 247 according to a priority order. For example, the middleware 143 may grant to at least one of the application program 247 a priority order of using the system resources (e.g., the bus 210, the processor 220, or the memory 230) of the electronic device 201. For example, the middleware 243 processes the one or more operation requests according to the priority order granted to the at least one application program 247, thereby performing scheduling or load balancing of the one or more operation requests.

The API 245 is, for example, an interface for the application 247 to control the functions provided by the kernel 241 or the middleware 243, and may include at least one interface or function (e.g., command), for example, for file control, window control, image processing, or text control.

The input/output interface 250 may function as, for example, an interface capable of transmitting command or data input from the user or another external device to the other component(s) of the electronic device 201. In addition, the input/output interface 250 may output command or data transmitted from the other component(s) of the electronic device 201 to the user or another external device.

The display 260 may include, for example, a liquid crystal display (LCD), a light-emitting diode (LED) display, an organic light-emitting diode (OLED) display, a microelectromechanical systems (MEMS) display, or an electronic paper display. The display 260 may display, for example, various pieces of content (e.g., text, images, videos, icons, or symbols) to the user. The display 260 may include a touch screen, and may receive, for example, a touch input, a gesture input, a proximity input, or a hovering input via an electronic pen or a part of a body of the user.

The communication interface 270 may set communications between, for example, the electronic device 201 and an external device (e.g., a first external electronic device 202, a second external electronic device 204, or a server 206). For example, the communication interface 270 is connected to a network 262 via wireless communication or wires communication to communicate with an external device (e.g., the second external electronic device 204 or the server 206).

The wireless communication may use a cellular communication protocol, for example, at least one of long-term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM). Also, the wireless communication may include, for example, near distance communication 264. The near distance communication 264 may include, for example, at least one of wireless fidelity (WiFi), Bluetooth, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global stellite-based navigation system, according to used region or bandwidth. Hereinafter, in the present specification, GPS and GNSS may be interchangeably used. The wires communication may include, for example, at least one of universal serial bus (USB), high definition multimedia interface (HDMI), recommended standard-232 (RS-232), and plain old telephone service (POTS). The network 262 may include telecommunications network, for example, at least one of computer network (e.g., LAN or WAN), Internet, and telephone network.

The first and second external electronic devices 202 and 204 may each be a device of the same kind as or different from the electronic device 201. According to one embodiment, the server 206 may include a group of one or more servers. According to various embodiments, all or some of operations performed in the electronic device 201 may be executed in one or more other electronic devices (e.g., the electronic devices 202 and 204), or the server 206. According to one example embodiment, in a case where the electronic device 201 has to perform a certain function or service automatically or upon request, the electronic device 201 may request another device (e.g., the electronic devices 202 and 204, or the server 206) to perform at least some functions related to the certain function or service, instead of or additionally to the executing of the certain function or service on its own. The electronic device (e.g., the electronic device 202 and 204, or the server 206) may execute requested function or the additional function, and may transfer a result of execution to the electronic device 201. The electronic device 201 may provide requested function or service after processing or without processing the result. To do this, for example, a cloud computing, a distributed computing, or a client-server computing technique may be used.

Figure 24:
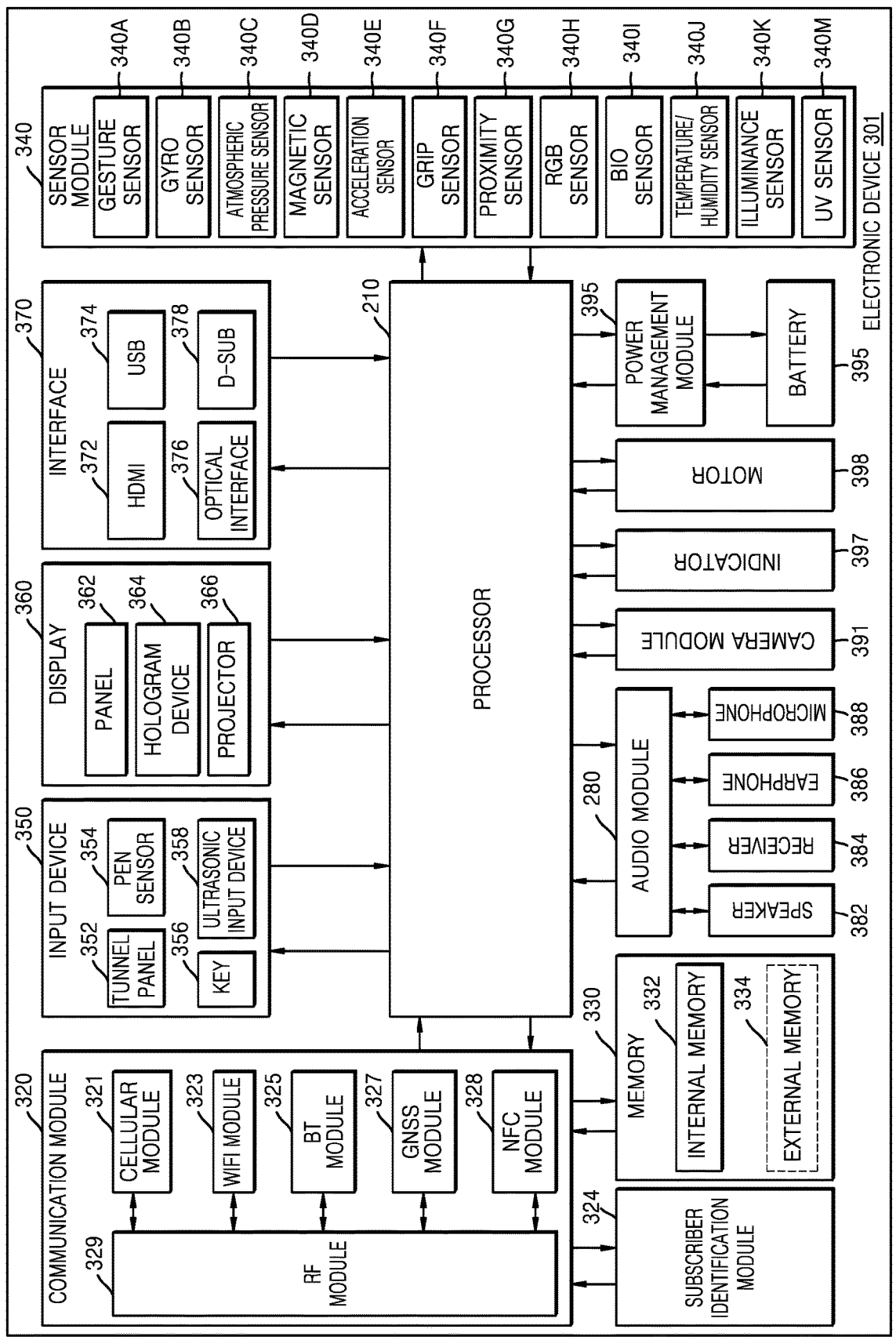
FIG. 24 is a block diagram of an electronic apparatus according to various embodiments.

FIG. 24 is a block diagram of an electronic device 301 according to various embodiments. The electronic device 301 may include, for example, whole or some parts of the electronic device 201 illustrated in FIG. 22. The electronic device 301 may include one or more processors (e.g., an application processor (AP)) 310, a communication module 320 (a subscriber identification module 324), a memory 330, a sensor module 340, an input device 350, a display 360, an interface 370, an audio module 380, a camera module 391, a power management module 395, a battery 396, an indicator 397, and a motor 398.

The processor 310 may drive, for example, an operating system or an application program to control a plurality of hardware or software components connected to the processor 310, and may perform various data processing and calculation. The processor 310 may be implemented as, for example, a system on chip (SOC). According to one example embodiment, the processor 310 may further include a graphic processing unit (GPU) and/or an image signal processor. The processor 310 may include at least some (e.g., a cellular module 321) of the components illustrated in FIG. 23. The processor 310 may load the command or data transmitted from at least one of the other components (e.g., non-volatile memory) on a volatile memory to process the command or data, and may store various data in the non-volatile memory.

The communication module 320 may have a structure that is the same as or similar to that of the communication interface 270 of FIG. 22. The communication module 320 may include, for example, a cellular module 321, a WiFi module 323, a Bluetooth module 325, a GNSS module 327 (e.g., a GPS module, a Glonass module, a Beidou module, or a Galileo module), an NFC module 328, and a radio frequency (RF) module 329.

The cellular module 321 may provide, for example, voice call service, video call service, text message service, or Internet service via a communication network. According to one example embodiment, the cellular module 321 may perform discrimination and authentication of the electronic device 301 within the communication network by using the subscriber identification module (e.g., a SIM card) 324. According to one example embodiment, the cellular module 321 may perform at least some of the functions that may be provided by the processor 310. According to one example embodiment, the cellular module 321 may include a communication processor (CP).

Each of the WiFi module 323, the Bluetooth module 325, the GNSS module 327, and the NFC module 328 may include a processor for processing data transmitted/received through the corresponding module. According to one example embodiment, at least some (e.g., two or more) of the cellular module 321, the WiFi module 323, the bluetooth module 325, the GNSS module 327, and the NFC module 328 may be included in one integrated chip (IC) or an IC package.

The RF module 329 may transmit/receive, for example, a communication signal (e.g., an RF signal). The RF module 329 may include, for example, a transceiver, a power amp module (PAM), a frequency filter, a low noise amplifier (LNA), or an antenna. According to another example embodiment, at least one of the cellular module 221, the WiFi module 323, the Bluetooth module 325, the GNSS module 327, and the NFC module 328 may transmit/receive an RF signal via an additional RF module.

The subscriber identification module 324 may include, for example, a card including the subscriber identification module and/or an embedded SIM, and may include unique identification information (e.g., integrated circuit card identifier (ICCID)) or subscriber information (e.g., international mobile subscriber identity (IMSI)).

The memory 330 may include, for example, an internal memory 332 or an external memory 334. The internal memory 332 may include, for example, at least one of a volatile memory (e.g., dynamic RAM (DRAM), static RAM (SRAM), synchronous dynamic RAM (SDRAM), etc.), a non-volatile memory (e.g., one time programmable ROM (OTPROM), programmable ROM (PROM), an erasable and programmable ROM (EPROM), an electrically erasable and programmable ROM (EEPROM), a mask ROM, a flash ROM, a flash memory (e.g., NAND flash, NOR flash, etc.), hard drive, or solid state drive (SSD).

The external memory 334 may further include a flash drive, for example, a compact flash (CF), secure digital (SD), micro-SD, Mini-SD, extreme digital (xD), a multi-media card (MMD), a memory stick, etc. The external memory 334 may be functionally and/or physically connected to the electronic device 301 via various interfaces.

The sensor module 340 may measure a physical amount or sense an operating state of the electronic device 301, so as to convert measured or sensed information into an electric signal. The sensor module 340 may include, for example, at least one of a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (e.g., a red, green, blue (RGB) sensor), a bio sensor 340I, a temperature/humidity sensor 340J, an illuminance sensor 340K, and an ultra violet (UV) sensor 340M. Additionally or alternatively, the sensor module 340 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 340 may include a control circuit for controlling at least one sensor included therein. In some embodiments, the electronic device 301 may further include a processor configured to control the sensor module 340 as a part of the processor 310 or separately, so as to control the sensor module 340 while the processor 310 is in a sleep state.

The input device 350 may include, for example, a touch panel 352, a (digital) pen sensor 354, a key 356, or an ultrasonic input device 358. The touch panel 352 may use at least one of, for example, a capacitive type, a pressure sensitive type, an IR type, and an ultrasound type touch screen. Also, the touch panel 352 may further include a control circuit. The touch panel 352 may further include a tactile layer to provide a user with a tactile reaction.

The (digital) pen sensor 354 may be, for example, a part of the touch panel 352, or may include an additional recognition sheet. The key 356 may include, for example, a physical button, an optical key, or a keypad. The ultrasound input device 358 may sense ultrasound wave generated from an input device via a microphone (e.g., a microphone 388) to identify data corresponding to the ultrasound wave.

The display 360 (e.g., the display 360) may include a panel 362, a hologram device 364, or a projector 366. The panel 362 may have a structure that is the same as or similar to that of the display 260 shown in FIG. 21. The panel 362 may be configured to be, for example, flexible, transparent, or wearable. The panel 362 may be configured as one module with the touch panel 352. The hologram device 364 may show a stereoscopic image in the air by using interference of light. The projector 366 may display images by projecting light onto a screen. The screen may be located, for example, inside or outside the electronic device 301. According to one example embodiment, the display 360 may further include a control circuit for controlling the panel 362, the hologram device 364, or the projector 366.

The interface 370 may include, for example, an HDMI 372, a universal serial bus (USB) 374, an optical interface 376, or a D-subminiature (D-sub) 378. The interface 370 may be included, for example, in the communication interface 370 shown in FIG. 22. Additionally or alternatively, the interface 370 may include, for example, a mobile high-definition link (MHL) interface, a secure digital (SD) card/multi-media card (MMC) interface, or infrared data association (IrDA) standard interface.

The audio module 380 may bi-directionally convert sound and electric signals to each other. At least some of components of the audio module 380 may be included in, for example, an input/output interface 245 shown in FIG. 22. The audio module 380 may process sound information input or output through, for example, a speaker 382, a receiver 384, earphones 386, or a microphone 388.

The camera module 391 is, for example, a device capable of capturing still images and videos, and according to an example embodiment, the camera module 225 may include one or more image sensors (e.g., a front sensor or a rear sensor), a lens, an image signal processor (ISP), or a flash (e.g., a light emitting diode (LED), a xenon lamp, etc.) For example, the optical lens assembly according to various embodiments may be applied to the camera module 391.

The power management module 395 may manage power of the electronic device 301. The electronic device 301 may be an electronic device receiving power supply from a battery, but is not limited thereto. According to one example embodiment, the power management module 395 may include a power management integrated circuit (PMIC), a charger IC, or a battery or fuel gauge. The PMIC may be charged through wires and/or wirelessly. The wireless charging method may include, for example, a magnetic resonance method, a magnetic induction method, or an electromagnetic wave method, and an additional circuit for wireless charging, for example, a coil loop, a resonant circuit, or a rectifier may be further provided. The battery gauge may measure, for example, a remaining capacity of the battery 396, a voltage, a current, or a temperature during the charging. The battery 396 may include, for example, a rechargeable battery and/or a solar battery.

The indicator 397 may display a certain state of the electronic device 301 or a part of the electronic device 301 (e.g., the processor 310), for example, a booting state, a message state, or a charging state. The motor 398 may convert an electric signal into mechanical vibration, and may generate vibration effect or haptic effect. Although not shown in the drawing, the electronic device 301 may include a processing device (e.g., GPU) for supporting mobile TV function. The processing device for supporting the mobile TV may process media data according to standard such as digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with various exemplary embodiments may include at least one of the aforementioned components, omit some of them, or include other additional components. Some of the components may be combined into an entity, but the entity may perform the same functions as the components may do.

The term "module" used herein may refer to a unit including one of hardware, software, and firmware, or a combination thereof. The term "module" may be interchangeably used with a unit, logic, logical block, component, or circuit. The "module" may be a minimum unit or part of an integrated component. The "module" may be a minimum unit or part of performing one or more functions. The "module" may be implemented mechanically or electronically. For example, the "module" may include at least one of application specific integrated circuit (ASIC) chips, field programmable gate arrays (FPGAs), or programmable logic arrays (PLAs) that perform some operations, which have already been known or will be developed in the future.

According to an exemplary embodiment, at least a part of the device (e.g., modules or their functions) or method (e.g., operations) may be implemented as instructions stored in a computer-readable storage medium e.g., in the form of a program module. The instructions, when executed by a processor (e.g., the processor 220 of FIG. 23), may enable the processor to carry out a corresponding function. The computer-readable storage medium may be, e.g., the memory 230.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, or the like. Examples of the program instructions may include not only machine language codes but also high-level language codes which are executable by various computing means by using an interpreter. The aforementioned hardware devices may be configured to operate as one or more software modules to carry out exemplary embodiments, and vice versa. Modules or programming modules in accordance with various exemplary embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s). The embodiments provided herein are provided for describing and comprehending the technical features suggested herein, and do not restrict the scope of technical range. Therefore, the scope of this document should be construed to include all the changes, or various other embodiments based on the technical concept of the present disclosure. It will be apparent to those skilled in the art that the embodiments are given by way of illustration only, and that various modifications and equivalent embodiments may be made without departing from the spirit and scope of the present disclosure. Accordingly, the scope of the present disclosure should be limited only by the accompanying claims.

The invention claimed is:

1. An optical lens assembly comprising, sequentially from an object side to an image side:
   a first lens having a positive refractive power and including a surface concave towards the image side;
   a second lens having a negative refractive power;
   a third lens having a negative refractive power; and
   a fourth lens having a positive refractive power and adjacent to the image side, wherein the optical lens assembly satisfies the following condition:

$0 \le YL/YM < 0.4$ $28 < FOV < 60$ (Degrees),  <Condition> where YL denotes a distance from an optical axis to a maximum sag in an image side surface of the fourth lens, YM denotes ½ of an effective diameter of the image side surface of the fourth lens, and FOV denotes a viewing angle.

2. The optical lens assembly of claim 1, wherein the first lens and the second lens configure a front group, and the third lens and the fourth lens configure a rear group.

3. The optical lens assembly of claim 2, wherein at least one of the third lens and the fourth lens has at least one aspherical surface, and the at least one aspherical surface has at least one inflection point.

4. The optical lens assembly of claim 3, further comprising an intermediate group including at least one of a fifth lens, a sixth lens, and a seventh lens,
   wherein the intermediate group is located between the front group and the rear group and has a negative refractive power.

5. The optical lens assembly of claim 4, further comprising an aperture stop between the front group and the rear group.

6. The optical lens assembly of claim 2, further comprising at least one aperture stop between the object side and the rear group.

7. The optical lens assembly of claim 2, wherein the optical lens assembly satisfies the following condition:

$0 < F1/EFL < 10$,  <Condition> where F1 denotes a focal length of the front group, and EFL denotes a focal length of the optical lens assembly.

8. The optical lens assembly of claim 1, wherein the optical lens assembly satisfies the following condition:

$0 < F11/EFL < 1$,  <Condition> where F11 denotes a focal length of the first lens, and EFL denotes a focal length of the optical lens assembly.

9. The optical lens assembly of claim 1, wherein the optical lens assembly satisfies the following condition:

$20 < Vd12 < 30$,  <Condition> where Vd12 denotes an Abbe's number of the second lens.

10. The optical lens assembly of claim 2, further comprising an intermediate group having a negative refractive power between the front group and the rear group, wherein the intermediate group includes one or two lenses and the optical lens assembly satisfies the following condition:

$-100 < F2/EFL < 0$, <Condition> where F2 denotes a focal length of the intermediate group, and EFL denotes a focal length of the optical lens assembly.

11. The optical lens assembly of claim 2, wherein the optical lens assembly satisfies the following condition:

$-100 < F3/EFL < 0$, <Condition> where F3 denotes a focal length of the rear group, and EFL denotes a focal length of the optical lens assembly.

12. The optical lens assembly of claim 2, wherein the optical lens assembly satisfies the following condition:

$-100 < F31/EFL < 0$, <Condition> where F31 denotes a focal length of the third lens, and EFL denotes a focal length of the optical lens assembly.

13. The optical lens assembly of claim 1, wherein the optical lens assembly satisfies the following condition:

$0.5 < F32/EFL < 100$, <Condition> where F32 denotes a focal length of the fourth lens, and EFL denotes a focal length of the optical lens assembly.

14. An optical lens assembly comprising, sequentially from an object side to an image side:
a first lens having a positive refractive power and including a surface concave towards the image side;
a second lens having a negative refractive power;
a third lens having a negative refractive power; and
a fourth lens having a positive refractive power and adjacent to the image side, wherein the optical lens assembly has a viewing angle that is greater than 35° and less than 49°.

15. An electronic device comprising:
an optical lens assembly; and
an image sensor configured to receive light focused by the optical lens assembly,
wherein the optical lens assembly comprises, sequentially from an object side to an image side:
a first lens having a positive refractive power and including a surface concave towards the image side;
a second lens having a negative refractive power;
a third lens having a negative refractive power; and
a fourth lens having a positive refractive power and adjacent to the image side, wherein the optical lens assembly satisfies the following condition:

$0 \le YL/YM < 0.4$ $28 < FOV < 60$ (Degrees), <Condition> where YL denotes a distance from an optical axis to a maximum sag in an image side surface of the fourth lens, YM denotes ½ of an effective diameter of the image side surface of the fourth lens, and FOV denotes a viewing angle.

* * * * *